(12) United States Patent
Epstein

(10) Patent No.: US 10,157,222 B2
(45) Date of Patent: Dec. 18, 2018

(54) METHODS AND APPARATUSES FOR CONTENT PREPARATION AND/OR SELECTION

(71) Applicant: Zalag Corporation, Sammamish, WA (US)

(72) Inventor: Samuel S. Epstein, Sammamish, WA (US)

(73) Assignee: Samuel S. Epstein, Sammamish, WA (US)

( * ) Notice: Subject to any disclaimer, the term of this patent is extended or adjusted under 35 U.S.C. 154(b) by 1137 days.

(21) Appl. No.: 14/105,034

(22) Filed: Dec. 12, 2013

(65) Prior Publication Data

US 2015/0169580 A1 Jun. 18, 2015

(51) Int. Cl.
*G06F 17/30* (2006.01)

(52) U.S. Cl.
CPC .. *G06F 17/30675* (2013.01); *G06F 17/30864* (2013.01)

(58) Field of Classification Search
CPC ................................................ G06F 17/30864
USPC ................................................ 707/749, 724
See application file for complete search history.

(56) References Cited

U.S. PATENT DOCUMENTS

| 8,145,636 | B1 | 3/2012 | Jeh et al. | |
| 2005/0055345 | A1 | 3/2005 | Ripley | |
| 2007/0059182 | A1 | 3/2007 | Stegemiller et al. | |
| 2007/0112815 | A1* | 5/2007 | Liu | G06F 17/30864 707/1 |
| 2007/0288438 | A1* | 12/2007 | Epstein | G06F 17/30864 707/3 |
| 2012/0233161 | A1 | 9/2012 | Xu et al. | |
| 2013/0103662 | A1 | 4/2013 | Epstein | |

OTHER PUBLICATIONS

International Search Report and Written Opinion for PCT Application No. PCT/US2014/062254 dated Feb. 4, 2015, 13 pages.

* cited by examiner

*Primary Examiner* — Chelcie Daye
(74) *Attorney, Agent, or Firm* — Schwabe, Williamson & Wyatt, P.C.

(57) ABSTRACT

Method, storage medium and apparatus associated with content preparation and/or selection are disclosed herewith. In embodiments, an apparatus may include a content preparation or selection module to receive, as part of a content preparation or selection, a representation of a concept; and determine, for the content preparation or selection, topical relevance of a content item (N) of a content hierarchy to the concept. The content hierarchy may include a plurality of content items, including N, and determine topical relevance of N to the concept may be based at least in part on interrelationships among at least some of the other content items of the hierarchy other than N, its ancestor content items, and/or its descendant content items. Other embodiments may be disclosed and/or claimed.

25 Claims, 6 Drawing Sheets

METHODS AND APPARATUSES FOR CONTENT PREPARATION AND/OR SELECTION

TECHNICAL FIELD

Embodiments of the present disclosure relate to the field of data processing, in particular, to methods and apparatuses for content preparation and/or selection that involves searching electronic documents and/or databases.

BACKGROUND

Notwithstanding the significant advances made in the past decades, electronic document and database technology continues to suffer from a number of disadvantages preventing users from fully realizing the benefits that may flow from advances in computing and related technology.

Current Web search employs both query-independent and query-dependent processes. Query-independent processes such as Google™ PageRank™ focus search results on well-cited or otherwise significant portions of the Web. With such focus, query-dependent processes developed for text search perform reasonably well. However, Web content is far more highly configured than plain text documents. Web pages typically contain complex content items that contain other complex content items. By their nature, text search processes ignore a great deal of useful information. Similar observations apply to markup search more generally, to keyword search over databases, and to database search more generally, especially for databases that have been subject to data mining. Prior extensions of text search processes take note of the relatively simple hierarchical configurations of classic text documents, and take note of inter-document configurations within collections of text documents. However, these prior extensions are not equipped to fully and efficiently use available configurational information.

U.S. patent application (USPA) No. 2007-0288438, and USPA No. 2009-0254549, among other things, introduced a new category of query-dependent search processes for configured content. These processes systematically apply configurational information and work in conjunction with text search processes, content valuation processes, database query processes, clustering processes, and other prior art technology. They enable more accurate and more focused search results. They also enable more highly specified search expressions. They also support the application of automatically generated search expressions that indicate nested juxtapositions of sub-expressions, such as those generated by methods introduced in USPA No. 2013/0103662. While the processes of USPA No. 2007-0288438, and USPA No. 2009-0254549 allow search matches within a given content item to influence the relevance scores of content items that neither contain nor are contained by the given content item, these processes' sensitivity to the possibilities of mutual influence potentially can be further improved.

The use of configurational information necessarily requires computational resources. So does the evaluation of complex search expressions. The processes of USPA No. 2007-0288438, and USPA No. 2009-0254549 maintain efficiency in evaluating complex search expressions over complex content hierarchies. However, additional opportunities for optimization remain, as do opportunities for shifting the computational burden to systems that operate prior to search time, opportunities for distributing both search-time processing and pre-search-time processing among various system instances, and opportunities for maintaining consistency in the assignment of numerical relationships within and across content hierarchies.

DETAILED DESCRIPTION OF ILLUSTRATIVE EMBODIMENTS

Figure 1:
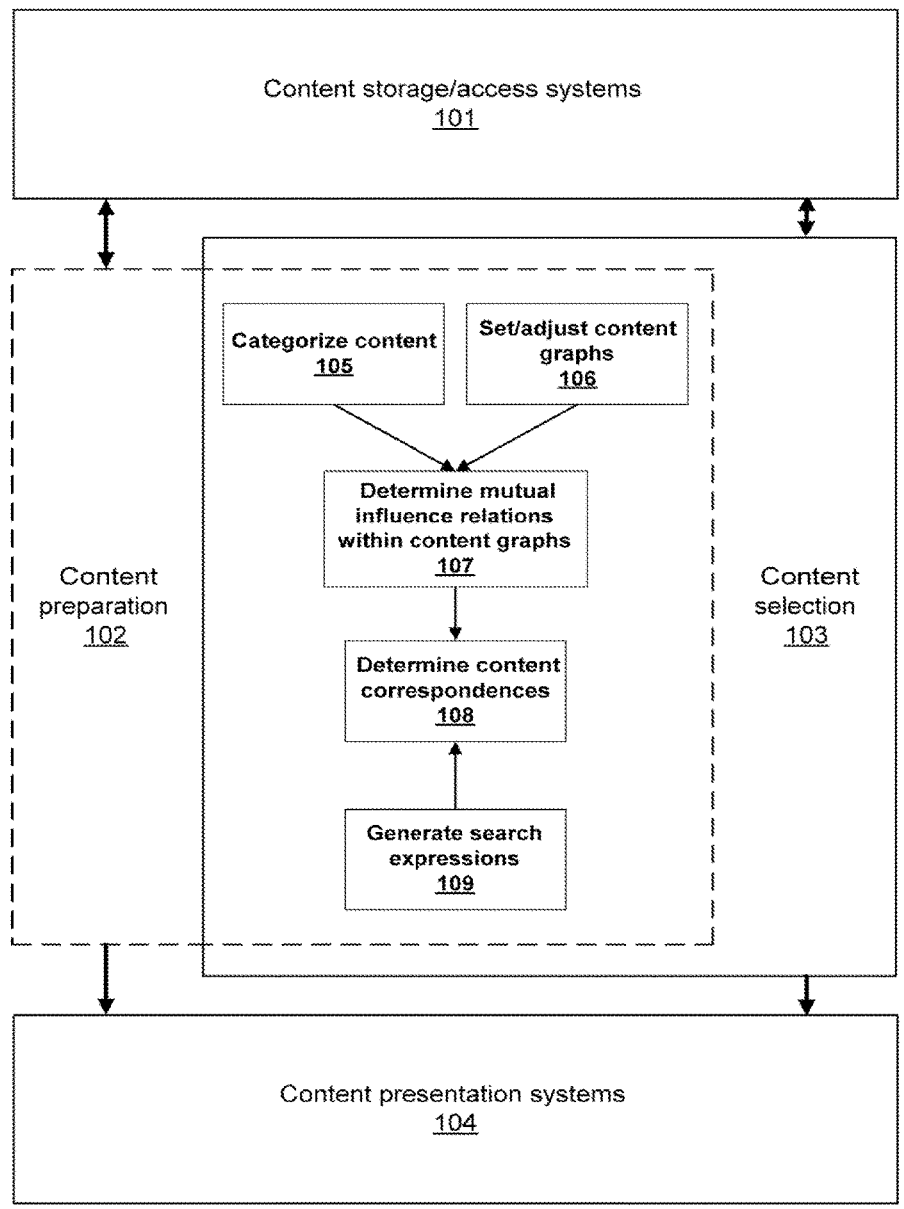
FIG. 1 illustrates processing modules invoked in applications that prepare, store, select, and present content, in accordance with various embodiments.

Illustrative embodiments of the present disclosure include but are not limited to methods, storage medium and apparatuses for content preparation and/or selection, in particular, an apparatus that includes a content preparation or selection module to receive, as part of a content preparation or selection, a representation of a concept; and determine, for the content preparation or selection, topical relevance of a content item (N) of a content hierarchy to the concept. The content hierarchy may include a plurality of content items, including N, and determine topical relevance of N to the concept may be based at least in part on interrelationships among at least some of the other content items of the content hierarchy other than N, its ancestor content items, and/or its descendant content items. Further, other embodiments may include determination of topical relevance of a content item in an externally context-sensitive and/or externally juxtapositional-sensitive manner, and/or may be based on external mediated influence, to be described more fully below.

The present disclosure's methods and apparatuses potentially permit search results to correspond more accurately to users' requests. In various embodiments, search results may systematically reflect the principle that proximity to relevant content is an indicator of relevance. In various embodiments, searches return content items of varying granularity. In various embodiments, search requests may be formulated with a non-associative juxtaposition operator, permitting more accurate results for searches based on combinations of search terms. In various embodiments, computations of search results are subject to diverse optimizations. The present disclosure's methods and apparatuses can be applied in advance of content-request time, and the resulting content-related information can be stored and then accessed at content-request time. Processing that incorporates the present disclosure's methods and apparatuses can be applied in parallel threads within a single computer system, and/or can be distributed across diverse systems. The present disclosure's methods and apparatuses may apply to Web search, and in particular to mobile Web search. They also may apply to search of document content more generally, and to search of content stored in databases more generally. They also may apply to finding content instances that are related according to diverse similarity criteria, and more generally to finding instances of data complexes that are related according to diverse similarity criteria.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Referring now to FIG. 1, wherein a block diagram illustrating processing systems, functions, and modules invoked in applications that prepare, store, select, and present content, in accordance with various embodiments, is shown. As illustrated, for the embodiments, the processing systems and functions may include content storage/access systems 101, content preparation functions 102, content selection functions 103, and content presentation systems 104, operatively coupled with each other, to prepare, store, select and present content. "Content," as used herein, may include, but is not limited to, plain text, media such as images, video, and audio, fully-specified markup such as DHTML files and XML files, partially-specified markup files such as server pages, database fields, database records, database tables, and data complexes constructed from primitive data. In embodiments, content storage/access systems 101 may include, but are not limited to, file systems, database management systems, and content management systems. Content preparation functions 102 may include, but are not limited to, functions such as Web page authoring, server page authoring, database schema design, data collection, Web crawling, data analysis as through data mining and predictive analytics, inverse indexing, and content valuation as through application of Google™ PageRank™ Some, but not all, content preparation functions may rely on human input in conjunction with greater or lesser amounts of automatic assistance, and/or guidance, and/or analysis. Content selection functions 103 may include, but are not limited to, functions such as identifying a sequence of Web pages that correspond to a given search expression ("Web search"); identifying a sequence of Web page constituents that correspond to a given search expression; choosing advertisements to appear on a Web page; choosing Web page links, with associated content, to appear on a social media news feed; choosing clothing items, or streamed movies, or music discs, or news stories, that correspond to a given search expression and/or that correspond to a given instance or set of instances of similar items, and/or that correspond to a user profile, and/or that correspond to a demographic profile, and/or that correspond to a given time, and/or that correspond to a given location; choosing events or sets of events, as defined according to data-related conditions, that correspond to a given search expression and/or that correspond to a given event or set of events; and choosing other entities, where entities are defined according data-related conditions, that correspond to a given search expression and/or that correspond to a given similar or non-similar entity or set of similar or non-similar entities. Content presentation systems 104 may include, but are not limited to, functions such as generating a database report, instantiating a server page as a Web page by a content management system, rendering a Web page by a proxy server, rendering and painting a Web page by a Web browser, displaying news items by a dedicated news app, displaying items for purchase by a dedicated retail app, and displaying posts by a dedicated social app. Content preparation functions 102 may receive input from content storage/access systems 101, and in some cases send their output to possibly different content storage/access systems. Content selection functions 103 may also receive input from content storage/access systems 101, and in some cases send their output to possibly different content storage/access systems. Content preparation functions 102 and content selection functions 103 may participate independently or together in supplying content to content presentation systems 104. In embodiments, modules 105-109 may be incorporated with the teachings of the present disclosure. As will be apparent from the descriptions to follow, any or all of 105-109 may be used in conjunction with modules incorporating prior art methods in content preparation functions 102, and/or in content selection functions 103. Categorize content module 105 may be configured to associate content items with content categories, such as the category that comprises captioned images, and the category that comprises news articles related to the topic of international commerce. Set/adjust content graphs modules 106 may be configured to establish directed acyclic graphs of documents and other content items according to the containment relation or according to other relations. Module 106 may also be configured to adjust such directed acyclic graphs, in cases where the graphs have previously been established by module 106, and also in cases where the graphs have been established by modules incorporating prior art methods. The adjustments of module 106 may include inserting new nodes, moving nodes, adding parent-child relationships, and similar. Module 105 and/or module 106 may be configured to send their outputs to module 107, configured to determine mutual influence relations within content graphs. Module 105 and/or module 106, in embodiments, however, may bypass module 107 and send their output directly to module 108, configured to determine content correspondence. Module 105 and/or module 106, still in other embodiments, may bypass both module 107 and module 108 so that the outputs of 105 and/or 106 may go directly to prior art content preparation and/or content selection modules, or go directly to content presentation systems 104 and/or go directly to content storage/access systems 101. Determine mutual influence relations within content graphs module 107 may analyze the potential of content items within content graphs to influence relevance for other content items within the content graphs. Module 107, in embodiments, may bypass module 108 so that the output of 107 goes directly to prior art content preparation and/or content selection modules, or goes directly to content presentation systems 104 and/or content storage/access systems 101. Determine content correspondences module 108 may be configured to assign scores to content items paired with search expressions. Module 108 thus may perform a function commonly associated with the term "search." Module 108 may operate in conjunction with modules incorporating prior art methods. Generate search expressions module 109 may be configured to generate search expressions from content items. When module 109 operates in conjunction with module 108, module 108 may perform functions that extend beyond the functions commonly associated with the term "search." For example, 108-109 may assign scores to pairs of content items that reflect content items' mutual relevance. More generally, 108-109 may determine similarities among entities that are defined according to data-related conditions, where the similarities may or may not involve "relevance" as this term is commonly understood.

While for ease of understanding, the functions performed by systems, functions, and modules 101-109 are illustrated as distinct components, in practice, their functions may be partitioned and assigned to different smaller modules and/or tasks. Alternatively, they may be combined in a single module. The various modules and/or tasks may be executed as a single thread, or as multiple threads where appropriate. In various embodiments, the execution of systems, functions, and modules 101-109, may be on the same system, and in other embodiments, they may be on different systems. For these latter embodiments, communications among systems, functions, and modules 101-109 may be in accordance with any one of a number of communication protocols, including but not limited to HTTP and/or HTTPS, with or without going through one or more communication modules/layers (where HTTP=Hypertext Transmission Protocol, and HTTPS=Hypertext Transmission Protocol Secured). In still other embodiments, other implementation arrangements may also be possible.

I. Framework

A. Content Hierarchies, Content Items, and Content Universes

Hereafter, the term "content hierarchy" will be used to refer to documents, such as Web pages, XML documents, and text documents, and more inclusively to content such as sub-documents, collections of documents and sub-documents, database records/objects, and collections of database records/objects, where database records/objects may be drawn from one or more databases and/or one or more database views. In some but not all cases, content comes equipped with configurational information. For example, for a document, configurational information may include specification of which sub-documents of the document contain which other sub-documents of the document. Embodiments of the present disclosure, as well as prior art, may deduce configurational information from a given content hierarchy, and add this new information to the content hierarchy. In some cases, these embodiments may replace given configurational information with new configurational information. Hereafter, the term "content item" will be used to refer to constituents of content hierarchies. A content item may be a document, a collection of documents, a syntactic constituent of a document, a semantic constituent of a document, a sub-document that corresponds to neither a syntactic constituents nor a semantic constituent of the document, a collection of sub-documents, a database record/object, or a collection of database records/objects, where database records/objects may be drawn from one or more databases and/or one or more database views. Content items may themselves correspond to content hierarchies, and may contain other content items. According to various embodiments of the present disclosure, content hierarchies may be organized as trees, where the content item corresponding to a parent node contains the content items corresponding to the parent node's child nodes. More generally, according to various embodiments, content hierarchies may be organized as directed acyclic graphs according to the containment relation, so that a content item may be directly contained by more than one other content item. According to various embodiments, content hierarchies may be organized as directed acyclic graphs where the parent-child relation corresponds to a relation other than the containment relation. Hereafter, a terminal content item within a content hierarchy will be referred to as an "atomic content item." Note that what counts as an atomic content item depends on how the containing hierarchy is organized. For example, in some content hierarchies, words count as atomic content items, while in other content hierarchies, sentences count as atomic content items, while in yet other content hierarchies, sub-word morphemes count as atomic content items.

Hereafter, the term "content universe" will be used to refer to collections of content hierarchies, where the collections are inputs to pre-search-time processes that generate data to support search. The World Wide Web is an example of a content universe, with crawling, indexing, and caching as examples of pre-search-time processes. Note that nothing precludes a content hierarchy from coinciding with a content universe. For example, a database may be subject to pre-search-time processing to identify and record semantically-based clusters, and subject to search-time processing whose inputs include cluster memberships. Note further that pre-search-time processing of a content universe will typically include processing on an individual basis of all or some of the content hierarchies that comprise the content universe.

B. Themes and Queries

Hereafter, "theme" will be used as a realization of the notion of concept—that to which content may be topically relevant. An "atomic search expression" is either a quoted string of characters, or a string of characters that doesn't contain a designated delimiter (such as space, period, and quotation mark). Hereafter, "atomic theme" will be used to refer to concepts that correspond to atomic search expressions. According to various embodiments, atomic themes may correspond to words (such as "dog"), or phrases (such as "friendly dog"), or word classes that contain words related through regular morphological patterns (such as {"dog", "dogs"}), or classes of words related through morphological similarity more generally (such as {"dog", "dogs", "doggish", . . . }), or classes of words related through synonymy (such as {"dog", "pooch", . . . }) and/or morphological similarity, or classes of words annotated with parts of speech (such as ({"dog", . . . }, noun)), or syntactic patterns wholly or partially filled by words, phrases, or word classes (such as the subject-verb-object pattern with the subject slot filled by a class represented by "dog," with the verb slot filled by a class represented by "chase," and with the object slot unfilled). Various embodiments identify and represent classes and/or patterns according to various methods of prior art.

Further, according to various embodiments, atomic themes may correspond to database queries, such as the SQL query, "SELECT ISBN FROM BOOK WHERE AUTHORLASTNAME='XYZ'", or may be expressions that specify details of XML, HTML, or other markup documents, such as the XPATH expression "//book [authorlastname='Xyz']".

However, not all language patterns count as atomic themes, not all database queries count as atomic themes, and not all queries specifying markup details count as atomic themes. An atomic theme necessarily corresponds to a concept, to which a content item may or may not be topically relevant. Whether a particular language pattern or query corresponds to a concept is ultimately a matter of judgment, or of stipulation. In very many cases, judgments of concepthood are likely to be uncontroversial. For example, the SQL query in the preceding paragraph, the XPATH expression in the preceding paragraph, and the phrase "author Xyz" correspond to very similar concepts. In contrast, the SQL query "SELECT ISBN FROM BOOK WHERE (ISBN % 11)=0" (books whose ISBN's are divisible by 11), corresponds to a concept only in far-fetched circumstances. Similarly, the XPATH expression "//TR[position( ) mod 11=0]" (table rows whose positions in the table are multiples of 11) corresponds to a concept only in far-fetched circumstances. Similarly, the text pattern "contains 'dog' within 11 words of 'cat'" corresponds to a concept only in far-fetched circumstances.

Hereafter, when the term "relevance" is used without qualification, it refers specifically to "topical relevance," a relationship between topics (themes) and content, and similarly for "relevant." Distinct themes may be mutually relevant. In particular, themes may be mutually relevant on the condition that their corresponding concepts are perceived as mutually relevant, or on the condition that their corresponding concepts are perceived to be perceived to be mutually relevant. For example, it's a mathematical fact that $-e^{i\pi}$ equals 1. However, most people who are not currently undergoing their secondary school mathematics training have slight awareness of this fact, or no awareness of this fact. A secondary school mathematics teacher, or someone else with perfect awareness of the fact, might still judge that "$-e^{i\pi}$" is not very relevant to "1" for purposes of search, because that person perceives that most people don't perceive "$-e^{i\pi}$" to be relevant to "1," or because "1" figures in many more subject matter contexts than "$-e^{i\pi}$" so expressed. In contrast, awareness that $H_2O$ is equivalent to water is much more widespread. Consequently, a judgment that "$H_2O$" is relevant to "water" for purposes of search is reasonable.

Further, themes that correspond to concepts in various semantic or factual relationships may be mutually relevant. For example, if one theme corresponds to a category, and another theme corresponds to a sub-category or super-category of the first theme, then the two themes may be mutually relevant, on the condition that the sub-/super-category relationship is perceived, or is perceived to be perceived. Thus a judgment that "dog" is relevant to "beagle" for purposes of search is reasonable, and a judgment that "beagle" is relevant to "dog" for purposes of search is reasonable. For another example, the factual relationship between Napoleon Bonaparte and Josephine Beauharnais may support a judgment that "Napoleon Bonaparte" and "Josephine Beauharnais" are mutually relevant.

Relevance judgments, which may be recorded as numerical assignments of degrees of relevance, reasonably depend in part on the semantic or factual relationships of concepts corresponding to themes. For example, equivalent concepts may reasonably be judged more mutually relevant than concepts that stand in a sub-/super-category relationship. Moreover, the less the relative set-difference between the sub-category and super-category, the more mutually relevant the concepts. Thus "beagle" and "dog" are more mutually relevant than are "beagle" and "mammal."

Further, relevance judgments reasonably depend in part on the extent to which a relationship instance is recognized, as illustrated by the $H_2O/-e^{i\pi}$ contrast discussed above. Such recognition judgments may be made relative to particular populations, or relative to particular individuals. For example, the mutual relevance of "$H_2O$" and "water" might be judged higher in the context of search within a Web site intended for chemists, than in the context of general Web search.

An atomic theme is a "theme." The juxtaposition of two or more themes yields a "mixed theme," which is itself a "theme." For example, the juxtaposition of the atomic themes corresponding to "dog" and "cat" is a theme. An article on the topic of dogs and cats living in the same houses would be highly relevant to this theme.

Hereafter, "o" (lower case Greek letter omicron) denotes the theme juxtaposition operator. According to various embodiments of the present disclosure, the theme juxtaposition operator is commutative (as with the structural proximity operator ## of USPA No. 2007-0288438, and USPA No. 2009-0254549). According to alternative embodiments, the theme juxtaposition operator is non-commutative. According to various embodiments of the present disclosure, the theme juxtaposition operator is associative. According to alternative embodiments, the theme juxtaposition operator is non-associative (as with the structural proximity operator ## of USPA No. 2007-0288438, and USPA No. 2009-0254549). Hereafter, presentation of examples will assume that the theme juxtaposition operator is commutative and non-associative.

Figure 2:
FIG. 2 illustrates how a non-associative juxtaposition operator can reflect contrasting content hierarchies.

FIG. 2 illustrates how a non-associative juxtaposition operator can reflect contrasting content hierarchies. The content in FIG. 2 comprises a heading and six paragraphs. "_____" indicates any word other than "cat," "food," or "kitchen." The content in FIG. 2 is a better match for
 cat o (food o kitchen)
than for
 (cat o food) o kitchen
Hereafter, given a theme T that corresponds to an expression E constructed with the juxtaposition operator, a "sub-theme" of T corresponds to a sub-expression of E. Thus the atomic theme corresponding to "food" is a sub-theme of the non-atomic theme corresponding to "food o kitchen." The non-atomic theme corresponding to "food o kitchen" is a sub-theme of the non-atomic theme corresponding to "cat o (food o kitchen)." For purposes of brief exposition, themes will be identified with corresponding expressions.

A content item may be relevant to a theme to a greater or lesser extent. Theme specifications are often vague and/or ambiguous, as when an atomic search expression is vague and/or ambiguous. Relevance is ultimately in the eye of the beholder. Evaluations of relevance encompass probability of correspondence between content item and theme, as well as quality of correspondence between content item and theme.

A theme is a query, in the sense that it can correspond to a request for content items that are relevant to the theme. Hereafter, an atomic content item that is relevant to an atomic theme will be called a "hit" for the theme. An atomic content item that is relevant to all atomic sub-themes of a complex theme will be called a "hit" for the theme. A content item that contains one or more hits for a theme will be called a "match" for the theme. For a complex theme T, a content item that contains at least one hit for each atomic sub-theme of T will be called a "match" for T. Hits for a theme are themselves "matches" for the theme. For a complex theme T, a content item that contains at least one hit for at least one atomic sub-theme of T will be called a "partial match" for T. Matches for a theme are themselves "partial matches" for the theme. For the theme that corresponds to the word "dog," an occurrence of "dog" is a hit, a text that contains the occurrence is a match, a product description that contains the text is a match, and a Web page that contains the product description is also a match. Any of the results for the SQL query "SELECT SERIALNUMBER FROM ALBUM WHERE GENRE='JAZZ' AND STYLE='BEBOP')" applied to a database is a hit for the corresponding theme. According to various embodiments, relevant content items may be identified through indirect means. For example, consider an article in an online periodical by someone named Xyz, where the article includes a header comprising the article title and "by Abc Xyz," rendered so that publishing conventions make it clear that Abc Xyz is the author. Then the byline content item may be identified as a hit for the theme corresponding to "author Xyz," the full article may be identified as a match for this theme, and a paragraph within the article that doesn't explicitly mention Xyz may be identified as a relevant content item for this theme. Hereafter, a content item whose relevance to an atomic theme is identified through indirect means will be called an "apposite" content item for the theme. A content item that is apposite to all sub-themes of a complex theme T is "apposite" to T. A content item that is apposite to at least one atomic sub-theme of a complex theme T is "partially apposite" to T. Apposite content items to a theme are themselves "partially apposite" to the theme. Matches for a theme are themselves "apposite content items" for the theme. Partial matches for a theme are themselves "partially apposite content items" for the theme.

Themes may occur within queries that do not themselves correspond to themes. An example of such a query asks for product descriptions matching "wheel" that appear on Web pages that contain product descriptions matching "tire."

Embodiments of the present disclosure accommodate content items as imperfect matches to themes. For example, the theme corresponding to "pooch" might be considered as an imperfect match for the theme corresponding to "dog," given the differences in connotation between "pooch" and "dog." For another example, the theme corresponding to the SQL query "SELECT CUSTOMERID FROM CUSTOMER WHERE CUSTOMERZIPCODE=98075" might be considered as an imperfect match for the theme corresponding to the SQL query "SELECT CUSTOMERID FROM CUSTOMER WHERE CUSTOMERZIPCODE=98001", given that zip code 98075 is near zip code 98001. Various prior art methods assign scores to imperfect matches of search expression terminals. Embodiments of the present disclosure incorporate these prior art methods, and the methods of USPA No. 2007-0288438, as follows: first, imperfect match scores are normalized as positive real numbers less than 1, then in place of the formula $\Sigma_{1 \leq i \leq k} (1/(1+d_i)^x)$ of USPA No. 2007-0288438 (yielding the r-value of a word W in text S, where k is the number of perfect or imperfect matches for a given search expression terminal E in a given text, where x (the "distance attenuation exponent") is a positive real number, and where $d_i$ is the distance between W and the i-th occurrence of E), $\Sigma_{1 \leq i \leq k} (\varepsilon_i/(1+d_i)^x)$ is used instead, where $0 < \varepsilon_i \leq 1$ is the score assigned to the i-th perfect or imperfect match for E. Various embodiments similarly adjust final search scores according to scores assigned to imperfect matches to search expression terminals.

The method of the preceding paragraph for dealing with imperfect matches is similar to the method of USPA No. 2007-0288438 for assigning varying weights to different search atomic search expressions. For example, because "beagle" occurs more rarely than "dog," a literal match of "beagle" may be considered more significant than a literal match of "dog." Thus a literal match of "beagle" might be assigned a weight of 0.89, while a literal match of "dog" might be assigned a weight of 0.27. Moreover, according to the method of the preceding paragraph, "dog" might be assigned a score of 0.08 as an approximate match for "beagle." Numbers in the preceding two sentences are illustrative only. Various embodiments maintain annotated word and phrase lists with scores for approximate matches, weights for literal matches, and formulas for deriving other weights and scores. For an example of a formula for deriving weights, suppose that data is available that numerically indicates the relative rarity of words, where rarity may correspond to a general judgment, or may derive from counting occurrences within a given content universe. Then words may be assigned weights corresponding to a constant times relative rarity, so that the rarest words are assigned weights close to 1.0, and so that the most common words are assigned weights close to 0.0. For an example of a formula for deriving scores for approximate matches, suppose that data is available that indicates the relative rarity of words, and data is also available indicating which words participate in entailment relations with which other words. Because "is-a-beagle" entails "is-a-dog," the score for "dog" as a match for "beagle" can be a constant times the ratio of the relative rarity of "dog" with the relative rarity of "beagle."

Various embodiments of the present disclosure incorporate prior art methods that extend the concept of "hit" for words and phrases beyond literal string match. For example, morphological variants of a word may be considered as hits for the word. For another example, synonyms of a word may be considered as hits the word. Non-literal hits may be assigned scalar values according to presumed quality of hit.

Moreover, the concept of hit need not be tied to occurrences of words. Semantic categories may be catalogued in a more or less richly structured ontology, and assigned (exclusively or non-exclusively) to content items, by various prior art methods. For example, the XML and RDF standards support such assignments. The methods of the present disclosure apply to content hierarchies whose constituent content items have assigned semantic categories, in the same way that they apply to content hierarchies whose constituent content items match atomic search expressions.

C. Content Archetypes

In USPA No. 2007-0038643, and USPA No. 2007-0288438, the notion of "content category" includes widely used categories such as captioned images, and also sets of content items corresponding to highly specific one-off queries. Subject-matter content categories, such as "music" or "counterpoint in Haydn's Opus 20 quartets," may be distinguished from publishing-convention content categories, such as "captioned image" or "captioned image with image of less than 250,000 bytes." Content categories may be defined in terms of both subject matter and publishing conventions, for example "captioned image with image credited to Bourke-White."

Hereafter, the term "content archetype" will be used without formal definition to refer to a content category that has the following three characteristics: A content archetype is a prototype of a first-order template. A content archetype is built from and/or built into other content archetypes, and/or is built into first-order templates, and/or is built into content items. A content archetype is widely used.

Examples of "first-order templates" may include, but are not limited to, server pages and constituents of server pages (in the context of the World Wide Web), schemas and sub-schemas (in the context of databases), and XML Schemas and XML complex element declarations (in the context of XML documents). Informally, templates have slots. When the slots of a template are filled, the result is a content item. Content items may be more or less complex configurations, such as instances of Web pages, or instances of database tables, or instances of XML documents.

Content archetypes may correspond to prototypes of first-order templates. Captioned image is an example of a content archetype in the context of the Web, and also in the context of print publishing. Various first-order captioned image templates share some common properties but differ in such details as whether they include image credits, how the caption is positioned relative to the image, permitted number of characters in the caption, and so on. Employee table is an example of a content archetype in the context of relational databases. Various employee tables share the property that each row corresponds to an employee, but differ in such details as whether employee birthdate is represented, and for those employee tables where birthdate is represented, differ in date format and in constraints on date.

Concerning the building block characteristic of content archetypes, consider the captioned image archetype. The captioned image archetype is built from an image archetype and a short text archetype. It's built into a news article archetype. It's also built into server page constituents that instantiate the captioned image archetype, and into concrete instances of captioned images within HTML files.

Concerning the wide use characteristic of content archetypes, "wide" is obviously a matter of degree. Captioned images, for example, are very widely used. The literate population is conditioned from youth to recognize captioned images. Web site authoring systems may allow their users to incorporate captioned images, so-called, in server pages and static Web pages. Content recognition systems, as USPA No. 2007-0038643, and USPA No. 2007-0288438, may allow captioned images to be recognized as such. Content archetypes can be associated with more or less fully specified configurational information. For example, relationships among the saliences (discussed below) of constituents of a captioned image archetype may be stipulated or constrained, and relationships among the affinities (discussed below) of constituents of a captioned image archetype may be stipulated or constrained.

D. Relevance to Themes

Hereafter, relevance will be discussed in terms of functions that assign real numbers to (content item, theme) pairs, indicating the relevance of a given content item to a given theme.

1. Degree of Relevance; Probability of Relevance

Computationally generated valuations of relevance may correspond more or less exactly to human judgments of relevance. Assignment of a single number for relevance simultaneously reflects an assignment of degree of relevance, and an assignment of probability of relevance. A case where there's a relatively low probability of relevance, but where the degree of relevance is relatively high if present, may be assigned the same valuation of relevance as a case where there's a relatively high probability of relevance, but where the degree of relevance is relatively low if present. A single number for relevance may be thought of as the expected value of degree of relevance. According to various embodiments of the present disclosure, relevance is assigned a single number. According to alternative embodiments, relevance is identified with a function that assigns probabilities to degrees of relevance.

2. Relevance Inferred from General Knowledge

Prior art search technology typically incorporates the insight that word occurrences within texts are indicators of relevance. For example, a text with occurrences of "Haydn" is likely to be relevant to a theme corresponding to Franz Joseph Haydn. Prior art search technology further incorporates applications of inferences based on various categories of general knowledge. These categories include language-related knowledge, such as knowledge of synonyms, morphological variants, and common misspellings. They also include various categories of topical knowledge. For example, given that Haydn is known to be an 18th century Austrian composer, a text with occurrences of Haydn is likely to be relevant to a theme corresponding to 18th century Austrian composers. For another example, the knowledge that the composer Franz Joseph Haydn is more widely known than other people with the name "Haydn" supports a more confident judgment that a text with occurrences of "Haydn" is relevant to this particular person. Categories of general knowledge further include various categories of knowledge related to specific users and/or to specific populations of users. For example, if a specific user's known purchase patterns indicate that the user is a primarily a cyclist rather than a motorist, then the user's search for "tires" might be interpreted as a search for bicycle tires. Categories of general knowledge further include various categories of knowledge related to specific times and/or to specific places. For example, a search for "schedule" that comes from a particular airport on a particular day might be interpreted as a search for a flight schedule for that airport and day.

When relevance is inferred from general knowledge, a given content item may be judged to be highly relevant to each of a large number of atomic themes, even if the content item is relatively small according to such measures of quantity as word count.

Embodiments of the present disclosure apply prior art techniques for inferring relevance. According to various embodiments, such applications take the form of sub-routines optionally called at various points within various processes of the present disclosure. Output of such prior art applications can serve as input to calls of other sub-routines of processes of the present disclosure, and vice-versa.

3. Relevance Inferred from Context

Long-standing conventions of authorship, publication, and content organization underlie the principle that proximity to relevant content is an indicator of relevance. According to a companion principle, proximity to irrelevant content is an indicator of irrelevance.

Prior art also recognizes that more prominent relevant content items have greater capacity to affect the relevance of other content items than do less prominent relevant content items. For example, a hit within an article title has greater capacity to affect relevance than a hit within a paragraph in the article body. And prior art includes treatments where distance figures in the calculation of relevance scores. Various works of prior art use various distance measures, such as the number of intervening words, or the minimum number of clicks required to reach one Web page from another, or a chosen measure of tree distance in parsed markup.

In general, the capacity for a first content item to affect the relevance of a second content item does not depend solely on the distance between the content items and the prominence of the first content item, no matter how prominence and distance are defined. It also depends on other content items within the context of the first and second content items. In particular, it depends on the relationships these other content items have with the first and second content items and with each other. The capacity of the first content item to affect the relevance of the second is mediated through these relationships.

As an illustration of these principles, consider content hierarchies that include content items corresponding to recordings by Coleman Hawkins Over the course of his career, Hawkins participated in the development of several jazz styles, including swing and also including styles that preceded and followed swing chronologically. Consider the atomic theme corresponding to Hawkins juxtaposed with the atomic theme corresponding to swing juxtaposed with the atomic theme corresponding to cd, as when a user issues a search query such as "hawkins swing cd" or "'coleman hawkins' swing 'compact disc'" or similar, with the goal of finding compact discs that feature Hawkins playing swing. Further consider two Web pages. Each of the two Web pages contains product descriptions of compact discs, contains no other product descriptions, and contains minimal content other than product descriptions. Each of the two pages contains exactly 50 product descriptions, laid out in 10 rows of 5 product descriptions each. Each product description on each page mentions "CD." Each of the two pages is laid out according to a loose convention under which CD products containing earlier performances appear closer to the top of the page. Neither page is laid out according to any convention under which CD products appearing closer to the top of the page have greater capacity to affect relevance than CD products appearing closer to the bottom of the page. Each of the two pages contains exactly 1 product description that mentions Hawkins, where this product description does not contain "swing" or any morphological variant of any synonym of "swing," or any term particularly associated with swing as opposed to other jazz styles. Each of the two pages contains exactly 10 product descriptions that match swing, with all swing-matching product descriptions matching swing equally well, and with no other product descriptions matching swing. On each page, the swing matches all occur within 4 rows, the 1st through 4th rows for the first page, and the 4th through 7th rows on the second page. The 1st through 4th rows on the first page are identical to the 4th through 7th rows on the second page, with the same distribution of swing matches. The single Hawkins match occurs in the 6th row on the first page and in the 9th row on the second page, in the same position within the respective rows. The density of swing matches is the same for the two pages, whether density is measured in terms of product descriptions or in terms of words. The density of Hawkins matches is the same. The frequency of swing matches is the same. The frequency of Hawkins matches is the same. For purposes of inverse document frequency, by hypothesis the two pages belong to the same document corpus. The distances between Hawkins match and the swing matches are the same on both pages, whether distance is in terms of Cartesian distance between centers of product descriptions as laid out on pages, or in terms of word distance, or in terms of Manhattan distance, or in terms of other common distance measures. For purposes of this illustration, the question is whether the Hawkins CD product description on one of the Web pages is more apposite to swing than the Hawkins CD product description on the other Web page. For each of the two pages, the Hawkins CD product description is apposite to swing solely by virtue of its proximity to product descriptions that match swing. Comparing the first Web page, with swing matches in the 1st through 4th rows, and the second Web page, with swing matches in the 4th through 7th rows, the product descriptions in the 8th through 10th rows on the second page are farther from swing matches than any product descriptions in the first page. Given the chronological layout convention, the CD's described in 8th through 10th rows in the first page are relatively unlikely to contain swing performances, and relatively likely to contain performances in post-swing styles. The Hawkins CD in the first page is close to swing matches, but is also close to the CD's in the 8th through 10th rows, and correspondingly subject to their capacity to affect relevance. In contrast, the CD's described in the 1st through 3rd rows on the second page are somewhat likely to contain swing performances, given their distances from the swing matches in the 4th through 7th rows. These possible swing CD's aren't particularly close to the Hawkins match on the second page, but their capacity to affect the relevance of the Hawkins match isn't negligible. Comparing the proximity of the Hawkins CD to the 8th through 10th rows on the first page, with the proximity of the Hawkins CD to the 1st through 3rd rows on the second page, it may be judged that the Hawkins CD on the second page is more apposite to swing than the Hawkins CD on the first page. As an additional effect of these page-internal contrasts, it may be judged that the second page is a better match for swing than the first page.

Hereafter, for ease of exposition, unless otherwise qualified, the term "relevance" will be used in the sense of topical relevance. However, the methods of the present disclosure apply more generally. Content items may be generalized very broadly to items, including examples such as representations of customers in a database. The notion of appositeness may also be generalized very broadly, including examples such as representations of products that are apposite to representations of customers, or conversely, representations of customers that are apposite to representations of products. And the notion of proximity may be generalized very broadly. For example, proximity among customers might be based on prior purchases in common, or might be based on complex criteria that trade off multiple factors. If the notion of appositeness and the notion of proximity are such that apposite items may be expected to be found in proximity to other apposite items, methods of the present disclosure apply.

4. Proportion of Potential Relevance

Given a content item and a theme, the maximum potential relevance of the content item to the theme may be posited as a useful idealization. For purposes of this idealization, the meaning-bearing elements of the content item are allowed to vary, while the internal configuration of the content item is fixed. For example, suppose that the internal configuration of a informational article is analyzed roughly as follows: title of 7 words with a by-line of 7 words, followed by three paragraphs of 150, 100, and 200 words, respectively, with a captioned image that is not presented as anchored to any part of the text, where the captioned image comprises an image of 300 pixels by 400 pixels and a 15 word caption. Of course, given such a news article, alternative analyses of its internal configuration are possible, and similarly for other content items. As the words of the title, by-line, paragraphs, and caption vary, and as the image varies, judgments of the relevance of the article to a given theme will vary. Suppose that the given theme corresponds to the composer Beethoven. In the extreme case where every word of the article is "Beethoven" and where the image is of Beethoven, the article might be considered to be of maximum potential relevance to Beethoven. Alternatively, the article might be considered to contain very little information, and thus to be of small relevance to Beethoven. Embodiments of the present disclosure are compatible with both perspectives, and with alternative perspectives on maximum relevance more generally, including perspectives where the maximum potential relevance of a content item to a theme may depend on both the content item and the theme.

Hereafter, relevance will be discussed in terms of "proportion of potential relevance," where proportion of potential relevance is a real number greater than or equal to 0 and less than or equal to 1. If the proportion of potential relevance of a content item to a theme is 1, the content item could not any be any more relevant to the theme. If the proportion of potential relevance of a content item to a theme is 0, the content item could not any be any less relevant to the theme. Proportion of potential relevance corresponds to function that takes three arguments—a content item, a theme, and a content hierarchy. In what follows, $\rho$ (lower case Greek letter rho) will be used as a symbol for this function. N will be used as a variable over content items. When a parent content item within a content hierarchy is discussed together with its child content items, P may be used to refer to the parent content item. T will be used as variable over themes. C will be used as a variable over content hierarchies. The notation $\rho_C(N, T)=x$ will be used to indicate that the proportion of potential relevance of content item N to theme T, as evaluated in the context of content hierarchy C, is x. As previously noted, $0 \leq x \leq 1$. If the context of discussion establishes which content item and/or which theme and/or which content hierarchy are under consideration, any or all of C, N, and T may be omitted from the notation, as in $\rho(N, T)$, $\rho_C(N)$, $\rho$, and so on. Similarly, if the context of discussion doesn't involve specific C and/or N and/or T, any or all of these may be omitted from the notation. $\hat{\rho}(N, T)$ will be used as an alternative notation to $\rho_N(N, T)$, indicating the proportion of potential relevance of content item N to theme T in the context of N itself, rather than in the context of a larger content hierarchy that contains N. N and/or T may be omitted from this alternative notation if the context of discussion establishes which content item and/or which theme are under discussion, or if the context of discussion doesn't involve specific N and/or T. Hereafter, the "context-independent" proportion of potential relevance of N to T will refer to $\hat{\rho}(N, T)$. Moving N from one larger content hierarchy to another has no effect on the context-independent proportion of potential relevance of N to T.

Two effects of proportion of potential relevance may be distinguished. First, if a content item within a content hierarchy has positive $\rho$ with respect to one or more themes, it affects the relevance to those themes of other content items in the content hierarchy. Second, in the case where the conditions for satisfying a query include relevance to a theme, to the extent that a content item has positive $\rho$ with respect the theme, it makes the content item more suitable for delivery in response to the query. Of course, positive $\rho$ is only one of many factors that may affect deliverability, as discussed in USPA No. 2007-0288438. To add one additional example of such factors, in many circumstances the deliverability of content items falls off sharply as the amount of text (and/or image and/or video and/or audio) they contain decreases past a threshold—in the extreme, a content item comprising just an occurrence of an atomic search expression is unlikely to be useful as a response to a request for content items relevant to the theme corresponding to the atomic search expression.

To reflect the correspondence of content to search queries, various embodiments of the present disclosure calculate proportion of potential relevance as a ratio, where the numerator corresponds to a measure of actual relevance, and the denominator corresponds to a measure of maximum potential relevance. Such prior art measures as word density, as in number of matching words divided by total number of words, are similar insofar as they correspond to ratios. Instead of number of matching words, or number of matching content items, or a similar simple count, various embodiments use combined increments of relevance of content item N to theme T in hierarchy C as the numerator of a ratio, where increments of relevance may be attributed to the proximity of N to content items within C that are relevant to T. Instead of total number of words, or total number of content items, or similar simple count, these embodiments use maximum potential combined increments of relevance of N to T in C as the denominator of a ratio, where maximum potential combined increments of relevance of N to T in C corresponds to combined increments of relevance in the hypothetical situation where every content item of C has 1 as its context-independent proportion of potential relevance to T. Of course, the method used for calculating combined increments of relevance in the denominator must correspond to the method used for calculating combined increments of relevance in the numerator. Hereafter, when "proportion of potential relevance" or "$\rho$" is used without explicit mention of how the proportion is calculated, it's implicit that the proportion is calculated according to these embodiments. These and other, alternative embodiments, share the property that given N, T, and C, no content item of C, whether contained by N or not contained by N, contributes more than once to the numerator that corresponds to a measure of actual relevance, and no content item of C, whether contained by C or not contained by C, contributes more than once to the denominator that corresponds to a measure of maximum possible relevance.

E. Salience and Affinity

As noted above, long-standing conventions of authorship, publication, and content organization underlie the principle that proximity to relevant content is an indicator of relevance, and the companion principle that proximity to irrelevant content is an indicator of irrelevance. Given two content items within a content hierarchy, the first content item may have a greater or lesser capacity to affect the relevance of the second content item to themes. This notion of capacity to affect relevance relates pairs of content items. An abstraction yields a notion of the capacity of a content item within a content hierarchy to affect the relevance of other content items within the content hierarchy generally, with specific second content item abstracted out, and with specific theme abstracted out. Hereafter, this property of a single content item within a content hierarchy will be called "salience." Salience is a realization of the notion of prominence. For example, a news article title comprising 10 words in 24 point font typically has greater salience within the news article than a passage comprising 10 words in 12 point font within the body of the article. Hereafter, the term "affinity" will used to indicate the capacity of one particular content item within a content hierarchy to affect the relevance of a second particular content item within the content hierarchy, with the salience of the first content item abstracted out, and with specific theme abstracted out. For example, within a news article, a paragraph within the body of the article typically has greater affinity to the immediately following paragraph than to a paragraph that follows after 10 intervening paragraphs. Affinity is a realization of the notion of distance, in inverse. While greater distance implies less capacity to affect relevance, "affinity" will be used here with a convention that greater affinity implies greater capacity to affect relevance. Assignment of saliences to the content items of a content hierarchy may be partial. Assignment of affinities to the ordered pairs of content items of a content hierarchy may be partial. When the term "content hierarchy"

is used here, it refers to a directed acyclic graph of content items and/or other data, with accompanying assignment of saliences and affinities.

1. Salience

Salience, as used herein, is a measure that corresponds to the capacity of a content item within a content hierarchy to affect the relevance of other content items within the content hierarchy. While salience may correlate to some extent with measures of quality and quantity, in the general case, salience is distinct from such measures. Salience may be stipulated or inferred. Layout conventions and other publishing conventions, inherited from print publishing or otherwise, partially determine the salience of Web content. Concerning salience versus quality, a site home page may be more salient than another page on the site that ranks higher than the home page according to such quality measures as Google™ PageRank™. Concerning salience versus quantity, a 500-character paragraph in 24 point bold font may be more salient than a 2000-character paragraph in 12 point standard font. A 50-character title in 40 point bold font near the top of a Web page may be more salient than a 500-character paragraph in 24 point bold font in the middle of the page, even though the paragraph contains 10 times as many characters and occupies a larger area of the page. A 20-character topic sub-header in the form of a link, in 12 point font at the top of a news article Web page, may be more salient than the 50-character title of the single news article on the page, where the title appears in 40-point bold font, by virtue of specific-to-Web publishing conventions. For example, the text of the topic sub-header might be "Baseball," while various instances of article titles include "A Game for the Ages" and "Cy Young Candidate Fans 15." While the second title strongly indicates that the article is about baseball, drawing this conclusion requires baseball knowledge. The topic sub-header is expected to be a reliable indicator of subject matter, by virtue of publishing conventions. Salience measures may be assigned to documents, to sub-documents, to collections of documents and sub-documents, to database records/objects, and to collections of database records/objects, where database records/objects may be drawn from one or more databases and/or one or more database views.

Hereafter, for purposes of discussion it's assumed that salience is a function that maps (content item, content hierarchy) ordered pairs to positive real numbers, with larger numbers indicating greater salience, and thus greater potential for the content item's relevance to themes to affect the relevance of other content items to themes. As a matter of convenience, the content hierarchy involved in a salience relationship may be considered to be implicit, so that salience is a function that maps content items to positive real numbers. $\zeta$ (lower case Greek letter final sigma) will be used to denote this function, with $\zeta_C(N)$ indicating the salience of content item N within content hierarchy C.

2. Affinity

For an example of contrasting affinities, consider a news article. Two adjacent paragraphs tend to be more mutually relevant than paragraphs separated by ten intervening paragraphs. For another example, the caption of a captioned image tends to be more relevant to the image of that captioned image than to the image of a different captioned image. For document collections, library classification systems offer examples of affinity measures that reflect mutual relevance. Thus a book tends to be more relevant to a second book that shares its top-level Dewey class than to a third book that does not share this class. Also for document collections, various prior art methods automatically compute affinity measures that reflect mutual relevance. For example, latent semantic indexing has been applied to document classification. For databases, well-designed database schemes provide a foundation for affinity measures that reflect mutual relevance. Data mining can establish graph structures that supplement database schemes. These graph structures can provide additional foundations for affinity measures that reflect mutual relevance. Data mining can also more directly establish affinity measures that reflect mutual relevance.

According to various embodiments of the present disclosure, affinity may be asymmetric. Suppose that in some category of text documents, paragraphs of equal length may be considered to have equal salience, while for two adjacent paragraphs of equal length, the potential for the preceding paragraph to affect the relevance of the following paragraph is greater than the potential for the following paragraph to affect the relevance of the first paragraph.

Hereafter, for purposes of discussion it's assumed that affinity is a function that maps (content item, content item, content hierarchy) ordered triples to non-negative real numbers, with larger numbers indicating greater affinity, and thus greater potential for the first content item's relevance to themes to affect the second content item's relevance to themes. As a matter of convenience, the content hierarchy involved in an affinity relationship may be considered to be implicit, so that affinity is a function that maps (content item, content item) ordered pairs to non-negative real numbers. $\alpha$ (lower case Greek letter alpha) will be used to denote this function, with $\alpha_C(N_1, N_2)$ indicating the potential for $N_1$, with its salience abstracted, to affect the relevance of $N_2$ within content hierarchy C. $\alpha(N_1, N_2)$ will be referred to as the "the affinity of $N_1$ to $N_2$," or alternatively, as "the affinity of $N_2$ from $N_1$."

Various embodiments of the present disclosure allow stipulation or inference of affinity of content items to themselves, as in $\alpha_C(N, N)$ or $\alpha(N, N)$, hereafter referred to as "self-affinity." Moreover, some of these embodiments allow $\alpha(N_1, N_1) < \alpha(N_1, N_2)$ for $N_1 \neq N_2$. Consider a Web site where the HTML ALT attribute for images is used strictly to encode the following information on when and where photographs were taken: year, month, day, latitude, and longitude. No texts other than these values of the ALT attributes are directly associated with images. No image analysis is provided. On this Web site, images always appear with descriptive captions, where image and caption appear in HTML under a DIV constituent corresponding to a captioned image. For this Web site's captioned images, the content of the caption is generally a better indicator of the relevance of the image to themes than is the available content of the image itself. Put in other terms, the affinity of the caption to the image is greater than the affinity of the image to itself.

3. Influence

Hereafter, the increments of relevance that are communicated among content items within content hierarchies will be discussed in terms of "influence." $\iota$ (lower case Greek letter iota) will be used to denote the influence function, so that $\iota_C(N_1, N_2, T)$ is the influence of content item $N_1$ on content item $N_2$ for theme T within content hierarchy C. As with salience and affinity assignments, the content hierarchy involved in an influence relationship may be considered to be implicit. Also, the theme involved in an influence relationship may be considered to be implicit. Thus, for example, $\iota(N_1, N_2)$ indicates the influence of $N_1$ on $N_2$, with content hierarchy and theme both implicit.

Various embodiments of the present disclosure proceed from an assumption that the influence of content item $N_1$ on the relevance of content item $N_2$ to theme T within content hierarchy C is determined by the following three quantities: the salience of $N_1$, the affinity of $N_1$ to $N_2$, and the context-independent proportion of potential relevance of $N_1$ to T in C. Various embodiments define influence in terms of various functions applied to these three quantities. In particular, various embodiments proceed from an assumption that the influence of content item $N_1$ on the relevance of content item $N_2$ to theme T within content hierarchy C is proportional to these three quantities, so that $\iota_C(N_1, N_2, T) = K*\zeta(N_1)*\hat{\rho}(N_1, T)*\alpha(N_1, N_2)$, where $K>0$. Hereafter, for ease of exposition, such proportional influence will be assumed, and as a convention, K will be taken as equal to 1, and omitted from discussion.

"Self-influence," the influence of a content item on itself, is introduced as a terminological convenience. The self-influence of content item N for theme T, denoted as $\iota_C(N, N, T)$, will be taken as equal to $\zeta(N)*\hat{\rho}(N, T)*\alpha(N, N)$. "Relevance salience" will also be introduced as a terminological convenience. The relevance salience of content item N for theme T is equal to $\zeta(N)*\hat{\rho}(N, T)$. Hereafter, $\psi$ (lower case Greek letter psi) will be used as a variable over relevance salience.

4. Scaling Salience, Affinity, and Influence

Various embodiments of the present disclosure scale salience assignments. Suppose that content items $N_1, \ldots, N_k$ comprise the children of content item P in content hierarchy C. Suppose further that saliences for $N_1, \ldots, N_k$ are given so that $\Sigma_{1 \leq i \leq k}(\zeta(N_i)) \neq z$, where z is some target positive number. Then these embodiments change salience assignments for the children of P so that for $1 \leq j \leq k$, the new salience assignment of $N_j$ is $\zeta(N_j)/(\Sigma_{1 \leq i \leq k}(\zeta(N_i)))$. Thus the sum of the new salience assignments for the children of P is z. Various embodiments apply this scaling recursively over content hierarchies. For these embodiments, if the new salience assignments for the children of the root node of the hierarchy sum to 1, if the new salience assignment for a non-terminal content node P is $\zeta(P)$, and if the new salience assignments for the children of P sum to $\zeta(P)$, then the new salience assignments represent proportions of the total of the saliences assigned to the content hierarchy. Such salience scaling supports commensurability within and across content hierarchies, including content hierarchies assembled from content provided from multiple sources. It also partially counteracts possible attempts by content providers to manipulate search results through manipulation of salience assignments.

Various embodiments of the present disclosure scale affinity assignments among sibling content items within content hierarchies. Suppose that content items $N_1, \ldots, N_k$ comprise the children of content item P in content hierarchy C. Suppose further that the maximum affinity assignment $\alpha(N_i, N_j)$ for $1 \leq i,j \leq k$ is z, where $z>1$. Then some of these embodiments change salience assignments among ordered pairs of children of P so that for $N_i, N_j, 1 \leq i,j \leq k$, if the old affinity assignment is $\alpha(N_i, N_j)$, then the new affinity assignment is $\alpha(N_i, N_j)/z$. Suppose that the maximum over $1 \leq i \leq k$ of $\Sigma_{1 \leq j \leq k}(\zeta(N_j)*\alpha(N_j, N_i)) = z$, where $z>1$. Then alternative ones of these embodiments change affinity assignments among ordered pairs of children of P so that for $N_i, N_j, 1 \leq i,j \leq k$, if the old affinity assignment is $\alpha(N_i, N_j)$, then the new affinity assignment is $\alpha(N_i, N_j)/z$. Suppose that $\Sigma_{1 \leq i \leq k} \Sigma_{1 \leq j \leq k}(\zeta(N_j)*\alpha(N_j, N_i)) = z$, where $z>1$. Then other alternative ones of these embodiments change affinity assignments among ordered pairs of children of P so that for $N_i, N_j, 1 \leq i,j \leq k$, if the old affinity assignment is $\alpha(N_i, N_j)$, then the new affinity assignment is $\alpha(N_i, N_j)/z$. The computational cost of scaling affinities among $N_1, \ldots, N_k$ is reduced in commonly encountered cases. For example, in the case of a plain text comprising k words, if the salience of each word is defined as $1/k$, if the affinity of a word with itself is defined as 1, and if the affinity of a word with a different word is $1/(2+m)$, where m is the number of intervening words, then for word $N_i$, $\Sigma_{1 \leq j \leq k}(\zeta(N_j)*\alpha(N_j, N_i)) = 1/k*(\Sigma_{1 \leq j \leq i-1}(1/(1+i-j))+1+\Sigma_{i+1 \leq j \leq k}(1/(1+j-i)))$. $\Sigma_{1 \leq j \leq i-1}(1/(1+i-j))$ and $\Sigma_{i+1 \leq j \leq k}(1/(1+j-i))$ are harmonic numbers minus 1.

Such affinity scaling, in conjunction with the salience scaling discussed above, supports commensurability within and across content hierarchies, including content hierarchies assembled from content provided from multiple sources. It also partially counteracts possible attempts by content providers to manipulate search results through manipulation of affinity assignments.

Various embodiments of the present disclosure scale affinity assignments across levels within content hierarchies. Some of these embodiments scale affinity assignments in coordination with scaling of salience assignments across levels as discussed above. Suppose that content items $N_1, \ldots, N_k$ comprise the children of content item P in content hierarchy C, and suppose that the scaled salience of P corresponds to a proportion z, $0<z \leq 1$, of the sum of the scaled saliences of P and its sibling nodes. Then some of these embodiments change affinity assignments among ordered pairs of children of P so for $N_i, N_j, 1 \leq i,j \leq k$, if the old affinity assignment is $\alpha(N_i, N_j)$, then the new affinity assignment is $\alpha(N_i, N_j)*z$. These embodiments have the effect of canceling the inflation of influence of siblings of P on children of P that would otherwise occur when saliences are scaled across levels.

Hereafter, for content item N within a content hierarchy, a sibling node N' of an ancestor node of N will be called a "senior node" or "senior content item" of N, and N will be called a "junior node" or "junior content item" of N'.

Alternative embodiments that scale influence assignments across levels within content hierarchies recognize that the possibilities for siblings of a parent node to influence children of the parent node can vary within and across content hierarchies. In some cases, children of the parent content node may be more sensitive to influence from siblings of the parent content node. In some cases, children of the parent content node may be less sensitive to influence from siblings of the parent content node. In some cases, appropriate adjustments to sensitivity of influence from siblings of the parent node may be uniform among children of the parent node. In some cases, appropriate adjustments to sensitivity of influence from siblings of the parent node may be non-uniform among children of the parent node. Therefore, various alternative embodiments assign "parent-directed senior influence adjustment factors" to parent nodes, and scale influence assignments across levels within content hierarchies accordingly, so that if the parent-directed senior influence adjustment factor assigned to a parent node P is z, and if the old influence assignment of a senior content node N' on a child content node N of P for theme T is $\iota(N', N, T)$, then the new influence assignment of N' on N is $\iota(N', N, T)*z$. Other alternative embodiments assign "self-directed senior influence adjustment factors" to content nodes, and scale influence assignments across levels within content hierarchies accordingly, so that if the self-directed senior influence adjustment factor assigned to a content item N is z, and if the old influence assignment of a senior content node N' on N for theme T is $\iota(N', N, T)$, then the new influence assignment of N' on N is $\iota(N', N, T)*z$. Various embodiments assign both parent-directed senior influence adjustment factors and self-directed senior influence adjustment factors.

For ease of exposition, default assumptions concerning scaling will hereafter be as follows: salience assignments are scaled so that for each set of sibling content items, the sum of the saliences of the sibling content items is 1; affinity assignments are scaled so that for each set of sibling content items $N_1, \ldots, N_k$, the maximum over $1 \leq i \leq k$ of $\Sigma_{1 \leq j \leq k} (\zeta(N_j) * \alpha(N_j, N_i))$ is 1; no parent-directed or self-directed senior influence adjustment factor are assigned.

E. Proportion of Potential Relevance to Themes

1. Proportion of Potential Relevance to Atomic Themes

Resuming the discussion of proportion of potential relevance from discussion above, consider $\Sigma_{N \in C}(\iota_C(N, N_0, T))$, the sum of influences on content item $N_0$ for atomic theme T from all the content items within content hierarchy C. This sum includes the influence of $N_0$ on itself, and is equivalent to $\Sigma_{N \in C}(\zeta(N) * \rho_C(N, T) * \alpha(N, N_0))$. Also consider $\Sigma_{N \in C}(\zeta(N) * \alpha(N, N_0))$. This second sum corresponds to $\Sigma_{N \in C}(\iota_C(N, N_0, T))$ in the case where for every content item N in content hierarchy C, the proportion of potential relevance of N to T in C is 1, the maximum possible proportion of potential relevance. The first sum is suggestive of the combined increments of relevance to T that $N_0$ receives from itself and from the other content items within C. The second sum is suggestive of the maximum possibility of such combined increments of relevance for C. The first sum divided by the second sum is suggestive of the proportion of potential relevance of $N_0$ to T in C. But proportion of potential relevance cannot be defined so that $\rho_C(N_0, T) = (\Sigma_{N \in C} (\zeta(N) * \rho_C(N, T) * \alpha(N, N_0))) / (\Sigma_{N \in C}(\zeta(N) * \alpha(N, N_0)))$, because such a definition would be circular. $\rho_C(N_0, T)$ appears in a term of the numerator. Moreover, for every $N \in C$, this definition requires $\rho_C(N_0, T)$ as input to the calculation of $\rho_C(N, T)$.

For atomic theme T, various embodiments of the present disclosure avoid circularity in the definition of proportion of potential relevance by defining $\hat{\rho}(N, T)$ for the case where N is a terminal node of C (Case 1a). The embodiments then further define $\rho_P(N, T)$ for the case where P is a non-terminal node of C and where N is a child of P in C (Case 2a). The embodiments then further define $\hat{\rho}(N, T)$ for the case where N is a non-terminal node of C (Case 3a). The embodiments then further define $\rho_C(N, T)$ for the general case (Case 4a). For purposes of these definitions, and for all subsequent definitions that involve ratios, when the numerator of a ratio equals 0, the ratio is stipulated to equal 0, even when the denominator equals 0.

(Case 1a) Suppose content item N is a terminal node of content hierarchy C, such as a word or phrase within a text, or an image or media file. Then various embodiments define $\hat{\rho}(N, T)$ as discussed above. Thus if T is associated with the atomic search expression "beagle," if N is the word "beagle," $\hat{\rho}(N, T)$ might equal 1, while if N is the word "dog," $\hat{\rho}(N, T)$ might be positive but less than 1.

(Case 2a) If content item P corresponds to a non-terminal node of content hierarchy C, and if $N_1, \ldots, N_k$ comprise the children of content item P, then for each $N_i$, $1 \leq i \leq k$, various embodiments define $\rho_P(N_i, T)$ as $(\Sigma_{1 \leq j \leq k} (\zeta(N_j) * \hat{\rho}(N_j, T) * \alpha(N_j, N_i))) / (\Sigma_{1 \leq j \leq k} (\zeta(N_j) * \alpha(N_j, N_i)))$. This definition relies for non-circularity on prior computation of $\hat{\rho}(N_i, T)$, $1 \leq i \leq k$, through application of Case 1a, Case 2a, and Case 3a at lower levels of C.

(Case 3a) If content item P corresponds to a non-terminal node of content hierarchy C, and if $N_1, \ldots, N_k$ comprise the children of content item P, then various embodiments define $\hat{\rho}(P, T)$ as $(\Sigma_{1 \leq i \leq k} (\zeta(N_i) * \rho_P(N_i, T))) / (\Sigma_{1 \leq i \leq k} (\zeta(N_i)))$. This definition relies for non-circularity on prior computation of $\rho_P(N_i, T)$, $1 \leq i \leq k$, through application of Case 1a, Case 2a, and Case 3a at lower levels of C.

(Case 4a) For content item N in content hierarchy C, if $N_1, \ldots, N_k$ comprise the content items that are either siblings of N within C or senior to N within C, then various embodiments define $\rho_C(N, T)$ as $(\zeta(N) * \hat{\rho}(N, T) * \alpha(N, N) + \Sigma_{1 \leq i \leq k} (\zeta(N_i) * \hat{\rho}(N_i, T) * \alpha(N_i, N))) / (\zeta(N) * \alpha(N, N) + \Sigma_{1 \leq i \leq k} (\zeta(N_i) * \alpha(N_i, N)))$. This definition relies for non-circularity on prior computation of $\hat{\rho}(N, T)$ and $\hat{\rho}(N_i, T)$, $1 \leq i \leq k$, through application of Case 1a, Case 2a, and Case 3a at all levels of C.

2. Proportion of Potential Relevance to Themes Constructed with the Juxtaposition Operator Various embodiments of the present disclosure define the proportion of potential relevance of content item N to non-atomic theme $T_1$ o $T_2$ o $\ldots$ o $T_m$ on content hierarchy C as the arithmetic mean, or the geometric mean, or the harmonic mean, or some other function whose inputs are $\rho_C(N, T_1), \rho_C(N, T_2), \ldots, \rho_C(N, T_m)$. Hereafter, these embodiments will be said to incorporate the "theme-synthesized method" of calculating proportions of potential relevance to themes constructed with the theme juxtaposition operator, and the function that applies to $\rho_C(N, T_1), \rho_C(N, T_2), \ldots, \rho_C(N, T_m)$ will be called the "theme-synthesization" function and will be represented as "$F_T$." $F_T(\rho_C(N, T_1), \rho_C(N, T_2), \ldots, \rho_C(N, T_m))$ will be represented as $\tau_C(N, T)$, with the lower-case Greek letter "tau." (Various embodiments that incorporate the theme-synthesized method accommodate varying weights assigned to constituents of non-atomic themes. For example, suppose that for $1 \leq i \leq m$, $T_i$ is assigned a weight $0 < \omega_i \leq 1$. Various embodiments then calculate $\tau_C(N, T)$ as $F_T(\rho_C(N, T_1) * \omega_1, \rho_C(N, T_2) * \omega_2, \ldots, \rho_C(N, T_m) * \omega_m)$.) Alternative embodiments calculate the proportion of potential relevance of content item N to $T_1$ o $T_2$ o $\ldots$ o $T_m$ by the method described above for atomic themes. Hereafter, these embodiments will be said to incorporate the "hierarchy-synthesized method" of calculating proportions of potential relevance to themes constructed with the theme juxtaposition operator. The result of applying the hierarchy-synthesized method will be represented as $\kappa(N_i, T)$, with the lower-case Greek letter "kappa." Other alternative methods reconcile the theme-synthesized method and the hierarchy-synthesized method. For these alternative methods, the theme-synthesized method and the hierarchy-synthesized methods are both applied, and proportion of potential relevance of content item N to $T_1$ o $T_2$ o $\ldots$ o $T_m$ is the output of a "reconciliation" function whose first input is the result from applying the theme-synthesized method, whose second input is the result from applying the hierarchy-synthesized method, and whose output is the "reconciled" result for the proportion of potential relevance of N to $T_1$ o $T_2$ o $\ldots$ o $T_m$, where the reconciled result is greater than or equal to the greater of the theme-synthesized result and the hierarchy-synthesized result, and where the reconciled result is less than or equal to 1. An example of a reconciliation function is $\max(\rho_1, \rho_2) + (1 - \max(\rho_1, \rho_2)) * \min(\rho_1, \rho_2)$, where $\rho_1$ is the theme-synthesized result and $\rho_2$ is the hierarchy-synthesized result. Hereafter, whatever function is chosen as the reconciliation function will be represented as $F_R$. Reconciliation takes into account proximity of relevant content items at a given level of a hierarchy (theme-synthesized result), while also taking account proximity of content items at other levels of the hierarchy (hierarchy-synthesized result).

For theme T constructed with the juxtaposition operator, various embodiments of the present disclosure avoid circularity in the definition of proportion of potential relevance by defining $\hat{\rho}(N, T)$ for the case where N is a terminal node of C (Case 1b). The embodiments then further define $\rho_P(N, T)$ for the case where P is a non-terminal node of C and where N is a child of P in C (Case 2b). The embodiments then further define $\hat{\rho}(N, T)$ for the case where N is a non-terminal node of C (Case 3b). The embodiments then further define $\rho_C(N, T)$ for the general case (Case 4b). For each of Cases 1b, 2b, 3b, and 4b, these embodiments define proportions of potential relevance to higher level sub-themes of T in terms of proportions of potential relevance to lower level sub-themes of T. Through recursive application, Case 1b ultimately arrives at Case 1a, Case 2b ultimately arrives at Case 2a, Case 3b ultimately arrives at Case 3a, and Case 4b ultimately arrives at Case 4a.

(Case 1b) Suppose content item N is a terminal node of content hierarchy C. As discussed above, a terminal content item may be relevant to more than one distinct theme. For non-atomic theme $T_1$ o $T_2$ o ... o $T_m$, various embodiments define $\hat{\rho}(N, T_1$ o $T_2$ o ... o $T_m)$ as $F_T(\hat{\rho}(N, T_1), \ldots, \hat{\rho}(N, T_m))$, where $F_T$ is the theme-synthesization function discussed above.

(Case 2b) If content item P corresponds to a non-terminal node of content hierarchy C, if $N_1, \ldots, N_k$ comprise the children of content item P, and if non-atomic theme T corresponds to $T_1$ o $T_2$ o ... o $T_m$, then for each $N_i$, $1 \le i \le k$, various embodiments define the theme-synthesized result $\tau_P(N_i, T)$ as $F_T(\rho_P(N_i, T_1), \ldots, \rho_P(N_i, T_m))$, define the hierarchy-synthesized result $\kappa_P(N_i, T)$ as $(\Sigma_{1 \le j \le k} (\zeta(N_j)*\hat{\rho}(N_j, T)*\alpha(N_j, N_i)))/(\Sigma_{1 \le j \le k} (\zeta(N_j)*\alpha(N_j, N_i)))$, and define $\rho_P(N_i, T)$ as $F_R(\tau_P(N_i, T), T), \kappa_P(N_i, T))$. This definition relies for non-circularity on prior computation of $\hat{\rho}(N_i, T)$, $1 \le i \le k$, through application of Case 1b, Case 2b, and Case 3b at lower levels of C, and also on prior computation of $\hat{\rho}(N_i, T_j)$, $1 \le i \le k$, $1 \le j \le m$, through application of Case 2b.

(Case 3b) If content item P corresponds to a non-terminal node of content hierarchy C, if $N_1, \ldots, N_k$ comprise the children of content item P, and if non-atomic theme T corresponds to $T_1$ o $T_2$ o ... o $T_m$, then various embodiments define $\hat{\rho}(P, T)$ as $(\Sigma_{1 \le i \le k} (\zeta(N_i)*\rho_P(N_i, T)))/(\Sigma_{1 \le i \le k} (\zeta(N_i)))$. This definition relies for non-circularity on prior computation of $\rho_P(N_i, T)$, $1 \le i \le k$, through application of Case 1b, Case 2b, and Case 3b at lower levels of C.

(Case 4b) For content item N in content hierarchy C, if $N_1, \ldots, N_k$ comprise the content items that are either siblings of N within C or senior to N within C, and if non-atomic theme T corresponds to $T_1$ o $T_2$ o ... o $T_m$, then various embodiments define the theme-synthesized result $\tau_C(N, T)$ as $F_T(\rho_C(N, T_1), \ldots, \rho_C(N, T_m))$, define the hierarchy-synthesized result $\kappa_C(N, T)$ as $(\zeta(N)*\hat{\rho}(N, T)*\alpha(N, N)+\Sigma_{1 \le i \le k} (\zeta(N_i)*\hat{\rho}(N_i, T)*\alpha(N_i, N)))/(\zeta(N)*\alpha(N, N)+\Sigma_{1 \le i \le k} (\zeta(N_i)*\alpha(N_i, N)))$, and define $\rho_C(N, T)$ as $F_R(\tau_C(N, T), \kappa_C(N, T))$. This definition relies for non-circularity on prior computation of $\hat{\rho}(N, T)$ and $\hat{\rho}(N_i, T)$, $1 \le i \le k$, through application of Case 1b, Case 2b, and Case 3b at all levels of C, and also on prior computation of $\rho_C(N, T_j)$, $1 \le j \le m$, through application of Case 4b.

G. Properties of Functions that Assign Relevance Scores

For purposes of defining properties of functions related to search, so that these definitions apply to various treatments of search, the following terms will be used: "concept," "content item," "relevance score," "prominence," and "contextual distance." For a given concept, relevance scores are assigned to content items according to how closely content items correspond to the concept. As described earlier, themes correspond to concepts, and proportions of potential relevance correspond to relevance scores. Salience corresponds to prominence. Various treatments of search in prior art use prominence to affect relevance scores. For example, for Web content, text within an <H1> HTML constituent may be considered to have greater salience than text within an <H2> HTML constituent. Contextual distance corresponds to the inverse of affinity. Various treatments of search in prior art use contextual distance to affect relevance scores. For example, for plain text, if a first word exactly corresponds to a concept, then the relevance of a second word to the concept may be considered to vary inversely with the number of intervening words. For another example, for two Web pages such that one page can be reached from the other by sequentially clicking a link to a Web page and clicking a link within the consequently downloaded Web pages, the mutual relevance of the two Web pages may be considered to vary inversely as the minimum number of clicks required to reach one from the other.

Current Web search primarily applies to Web pages. More generally, suppose that there is a default granularity of content item for purposes of search. Hereafter, a function that assigns relevance scores for concepts to content items will be called "frangitive" if it applies to content items contained by content items of the default granularity. Hereafter, a function that assigns relevance scores for concepts to content items will be called "agglomerative" if it applies to content items that contain content items of the default granularity.

Embodiments of methods discussed thus far, support both frangitive and agglomerative search.

Suppose that no measure of prominence is given. Then it may be assumed by default that all content items have equal prominence. Suppose that no measure of contextual distance is given. Then it may be assumed by default that for any two ordered pairs of content items, the contextual distance of the first member of the pair to the second member of the pair is equal.

Suppose that a prominence measure is given, by default or otherwise. Hereafter, a function that assigns relevance scores for concepts to content items will be called "internally context-sensitive" if for some concept and for some content item $N_1$ that contains content items $N_2$ and $N_3$, where the prominence of $N_2$ is greater than or equal the prominence of $N_3$, the relevance score of $N_1$ for the concept is greater for case A than for case B, where case A and case B are identical, except that according to case A, among the content items contained by $N_1$, $N_3$ has relevance score x>0 for the concept while all other content items contained by $N_1$ have relevance score 0, and according to case B, $N_2$ has relevance score x for the concept while all other content items contained by $N_1$ have relevance score 0. Internal context-sensitivity implies that with prominence factored out, moving a hit within a content item can change the relevance score of the content item.

Suppose that a prominence measure is given, by default or otherwise, and that a contextual distance measure is given, by default or otherwise. Hereafter, a function that assigns relevance scores for concepts to content items will be called "externally context-sensitive" if for some concept and for some content items $N_1$, $N_2$, and $N_3$, where none of $N_1$, $N_2$, and $N_3$ contains any other of $N_1$, $N_2$, and $N_3$, where the prominence of $N_2$ is greater than or equal the prominence of $N_3$, and where the contextual distance from $N_3$ to $N_1$ is greater than or equal to the contextual distance from $N_2$ to $N_1$, the relevance score of $N_1$ for the concept is greater for case A than for case B, where case A and case B are identical with respect to the internals of $N_1$ as these bear on the relevance score for the concept of $N_1$, and identical with respect to assigned relevance scores for the concept to content items other than $N_1$, except that for case A, the relevance score for the concept of $N_3$ is greater than the relevance score for the concept of $N_2$, while for case B, the relevance score for the concept of $N_2$ is greater than the relevance score for the concept of $N_3$. External context-sensitivity implies that with prominence factored out, the effect on a content item N of moving a hit that lies outside N is not completely determined by the change in contextual distance from the hit to N.

Suppose that a prominence measure is given, by default or otherwise, and that a contextual distance measure is given, by default or otherwise. Suppose that there is a juxtaposition operator O that maps n-tuples of concepts to concepts, so that other things being equal, as the contextual distances between a content item and hits for concepts within an n-tuple of concepts decreases, the relevance score of the content item for the concept that is obtained through application of O to the n-tuple of concepts increases. Hereafter, a function that assigns relevance scores for concepts to content items will be called "non-associative" if O is non-associative. Hereafter, a function that assigns relevance scores for concepts to content items will be called "externally juxtapositionally sensitive" if for concept T that is a result of applying operator O to sub-concepts $T_1$ and $T_2$, and for content hierarchies $C_1$ and $C_2$ that contain sub-hierarchies, rooted respectively at $N_1$ and $N_2$, such that the sub-hierarchies rooted at $N_1$ and $N_2$ are identical with respect to member content items, parent-child relationships, assignments of relative prominence to content items, assignments of distances between content items, and assignments of relevance scores for T, $T_1$ and $T_2$ to member content items other than $N_1$ and $N_2$, such that the relevance score for $T_1$ for $N_2$ in $C_2$ is greater than or equal to the relevance score for $T_1$ for $N_1$ in $C_1$, and such that the relevance score for $T_2$ for $N_2$ in $C_2$ is greater than or equal to the relevance score for $T_2$ for $N_1$ in $C_1$, the relevance score for T for $N_1$ in $C_1$ is greater than the relevance score for T for $N_2$ in $C_2$. Hereafter, a function that assigns relevance scores for concepts to content items will be said to exhibit "mediated influence" if for some concept and for some content hierarchies $C_1$ and $C_2$, where $C_1$ and $C_2$ comprise the same directed acyclic graph of content items, except that $C_2$ contains exactly one content item $N_1$ that is not contained in $C_1$, where the prominences assigned to content items other than $N_1$ are the same for $C_2$ as for $C_1$, where the conceptual distances for pairs of content items, other than pairs of content items that include $N_1$, are the same for $C_2$ and $C_1$, where content item $N_2$ is the only content item in either $C_1$ or $C_2$ that matches the concept, and where $N_3$ is a content item that is contained in $C_1$ and $C_2$, the following is the case: the relevance score for $N_3$ is greater for $C_2$ than for $C_1$. In both $C_1$ and $C_2$, the relevance of $N_3$ to the concept may be affected directly by $N_2$, and the relevance of $N_3$ to the concept may be affected indirectly by other content items whose relevance to the concept is directly or indirectly affected by $N_2$. In $C_2$, $N_3$ receives an additional increment of relevance to the concept that $N_2$ matches, through the mediation of $N_1$. A function that assigns relevance scores for concepts to content items will be said to exhibit "external mediated influence" if for some concept and for some content hierarchies $C_1$ and $C_2$, where $C_1$ and $C_2$ comprise the same directed acyclic graph of content items, except that $C_2$ contains exactly one content item $N_1$ that is not contained in $C_1$, where the prominences assigned to content items other than $N_1$ are the same for $C_2$ as for $C_1$, where the conceptual distances for pairs of content items, other than pairs of content items that include $N_1$, are the same for $C_2$ and $C_1$, where content item $N_2$ is the only content item in either $C_1$ or $C_2$ that matches the concept, and where $N_3$ is a content item that is contained in $C_1$ and $C_2$, that contains neither $N_1$ nor $N_2$, and that is contained by neither $N_1$ nor $N_2$, the following is the case: the relevance score for $N_3$ is greater for $C_2$ than for $C_1$. Note that external mediated influence implies mediated influence.

Embodiments of methods discussed thus far, support assignments of relevance scores that are internally context-sensitive, externally context sensitive, externally juxtapositionally sensitive, and that exhibit external mediated influence. For example, suppose that within content hierarchy C, the following applies: for any two content items $N_1$ and $N_2$, where neither of $N_1$ and $N_2$ contains the other, where $N_1$ and $N_2$ are not siblings, and where if $(N_3, N_4)$ is the lowest pair of sibling content items such that $N_3$ is an ancestor of $N_1$ and $N_4$ is an ancestor of $N_2$, the affinity of $N_1$ to $N_2$ equals the affinity of $N_3$ to $N_4$. For C, a hit for theme T within a content item N whose affinity to its siblings is smaller leads to a smaller proportion of potential relevance for the parent of N (internal context-sensitivity), which leads to a smaller proportion of potential relevance for descendant$_s$ of siblings of the parent of N (external context-sensitivity). N influences the relevance of its siblings to T. The siblings of T communicate the increments of relevance they receive from N to the parent of N, and from there to siblings of ancestors of N and to descendant$_s$ of siblings of ancestors of N (external mediated influence). Suppose that sibling N' of N matches theme T'. Suppose that in content hierarchy C, content item $N_1$ is for a hit for theme $T_1$, content item $N_2$ is a hit for theme $T_2$, and no other content item is a hit for either $T_1$ or $T_2$. Suppose further that $N_3$ is a child of the lowest common ancestor of $N_1$ and $N_2$, and that $N_3$ is not an ancestor of either $N_1$ or $N_2$. The relevance of descendants of $N_3$ to $T_1$ o $T_2$ varies according to the affinity of $N_1$ from $N_2$, as well as according to the affinity of $N_3$ from $N_1$ and the affinity of $N_3$ from $N_2$ (external juxtapositional sensitivity).

II. Optimizations

The methods of the present disclosure can be embodied in processes such that the number of operations to calculate the proportion of potential relevance of a single content item in a content hierarchy to a single atomic theme, is quadratic in the number of content items in the hierarchy. Such processes may be impractical, due to the amount of computing resources available, for content hierarchies that contain many content items, even without considering the more computationally challenging case where proportion of potential relevance to a theme constructed with the juxtaposition operator is calculated for more than one content item. This section will introduce optimizations that individually and/or collectively enable practical computation of proportions of potential relevance, for content hierarchies ranging from complex single documents to large document collections to large databases to heterogeneous content hierarchies, and for themes ranging from atomic themes to complex themes constructed with the juxtaposition operator.

As described earlier, for content item N, theme T, and content hierarchy C, computation of $\hat{\rho}(N, T)$, under methods of the present disclosure, relies on prior computation of $\hat{\rho}(N', T)$ for all descendants N' of N in C. Computation of $\rho_C(N, T)$ relies on prior computation of $\hat{\rho}(N', T)$ for all senior content items N' of N in C. Various embodiments of the present disclosure calculate context-independent proportions of potential relevance to one or more themes, for one or more content items in a content hierarchy, in a depth-first traversal of the content hierarchy. Various embodiments subsequently calculate proportion of potential relevance, relative to the content hierarchy, to all or some of these themes, for all or some of these content items, in a second depth-first traversal of the content hierarchy. Hereafter, the discussion assumes that calculations of proportions of potential relevance proceed in this way, with two depth-first traversals of the content hierarchy. The first depth-first traversals will be referred to as the "$\hat{\rho}$ traversal" or the "rho hat traversal." The second depth-first traversal will be referred to as the "$\rho_C$ traversal" or the "rho sub C traversal."

According to various embodiments, the $\hat{\rho}$ traversal includes a "sibling influence outer loop" and a "sibling influence inner loop" for each parent content item that the $\hat{\rho}$ traversal visits. The sibling influence outer loop is an iteration over the children of a parent content node. For some embodiments, as the sibling influence outer loop visits child content node N, N becomes the "inbound sibling content item," and the sibling influence inner loop is executed for N. The sibling influence inner loop is also an iteration over the children of a parent content node. As the sibling influence inner loop visits child content node N', N' becomes the "oubound sibling content item," $\zeta(N')*\hat{\rho}(N', T)*\alpha(N', N)$ is added to the sum of inbound influences for N, and $\zeta(N')*\alpha(N', N)$ is added to the sum of maximum inbound influences for N. When the inner loop is complete, these sums are used to calculate $\rho_P(N, T)$ as in Case 2a and Case 2b. Where for these embodiments, the outer loop is inbound and the inner loop is outbound, for other, alternative embodiments, the outer loop is outbound and the inner loop is inbound. Hereafter, for ease of exposition, it will be assumed that the $\hat{\rho}$ traversal includes a sibling influence outer loop and a sibling influence inner loop, where the outer loop is inbound and the inner loop is outbound.

Various embodiments calculate results in addition to proportions of potential relevance during the $\hat{\rho}$ traversal and $\rho_C$ traversals. Some of these additional results may be required as inputs for the calculation of proportions of potential relevance. Some of these additional results may be required as inputs for the determination of necessary conditions, besides proportions of potential relevance to one or more themes, for content items to qualify as responses to a user request. For example, in the case of Web content, during the $\hat{\rho}$ traversal, widths and heights of rendered content items may be noted, these measurements may be input to the determination of content categories, and content categories may be input to the determination of saliences and affinities. For ease of exposition, hereafter it will be assumed that all required results, except for proportions of potential relevance of content items that are not terminal within the content hierarchy, are stored within the content hierarchy prior to the $\hat{\rho}$ traversal and the $\rho_C$ traversal. For example, it will be assumed that prior to the $\hat{\rho}$ traversal and the $\rho_C$ traversal, the hierarchical organization of the content hierarchy is fully given, that saliences and affinities are fully given, that it is known which non-terminal content items contain hits for which themes of interest, and that it is known which content items satisfy necessary conditions, besides proportions of potential relevance to themes of interest, to qualify as responses to the user request.

A. Optimizations Based on Encapsulation Per Set of Sibling Content Items

Case 2a and Case 2b, as earlier described, can be embodied in processes such that the number of operations to calculate the proportions of potential relevance to a theme for a set of sibling content items, relative to the parent of the sibling content items, is quadratic in the number of sibling content items. For calculations of proportions of potential relevance relative to parent content items, these processes may be said to "encapsulate" the calculations per set of sibling content items, in the sense that the processes require no inputs except those previously associated with the sibling content items themselves. Hereafter, a process will be said to be "encapsulated per set of sibling content items" if it applies to sets of sibling content items, and if the number of its inputs is less than or equal to $k_1*n+k_2$, where n is the number of sibling content items in a particular case, and where $k_1$ and $k_2$ are fixed for all sets of sibling content items, for all content hierarchies.

Case 4a and Case 4b, as earlier described, can be embodied in processes such that the number of operations to calculate the proportions of potential relevance to a theme for the content items in a content hierarchy, relative to the content hierarchy, is quadratic in the number of content items in the content hierarchy. For many content hierarchies, far fewer steps will be involved in calculating proportions of potential relevance if all sub-routines are encapsulated per set of sibling content items.

Various embodiments of the present disclosure accomplish this by introducing "accumulated senior influence" into the computation of proportions of potential relevance. Given content hierarchy C, content item N, and theme T, the accumulated senior influence on N for T in C corresponds to the combined influence on N for T in C from all the senior content items of N in C. The proportions of potential relevance of these senior content items reflect the proportions of potential relevance of their descendants. Thus accumulated senior influence, together with influence from sibling content items and self-influence, comprises the entirety of influence on a content item within a content hierarchy. Hereafter, "$\hat{\tau}_C(N, T)$" will be used to denote the accumulated senior influence on N for T in C. The maximum accumulated senior influence on N for T in C corresponds to a situation where every senior content item of N has proportion of potential relevance to T equal to 1. The maximum accumulated senior influence on N for a theme in C is the same for any theme, and will be denoted "$\check{\tau}_C(N)$".

Various embodiments calculate accumulated senior influences and maximum accumulated senior influences during the $\rho_C$ traversal. If content item N is the root of content hierarchy C, or if the parent of N in C is the root of C, then N has no senior content items in C, and $\hat{\tau}_C(N, T)=\check{\tau}_C(N)=0$. Otherwise, if the parent of N is P, if the senior influence adjustment factor for N (whether parent-directed from P or self-directed) is z, if the siblings of P are $N_1, \ldots, N_k$, and if theme T is atomic, then $\hat{\tau}_C(N, T)=\hat{\tau}_C(P, T)*z+\Sigma_{1 \leq i \leq k} (\zeta(N_i)*\hat{\rho}(N_i, T)*\alpha(N_i, N))$, and $\check{\tau}_C(N)=\check{\tau}_C(P)*z+\Sigma_{1 \leq i \leq k} (\zeta(N_i)*\alpha(N_i, N))$.

If T corresponds to $T_1$ o $T_2$ o $\ldots$ o $T_m$, then various embodiments calculate $\hat{\tau}_C(N, T)$ after calculating the "theme-synthesized accumulated senior influence" on N for T in C, denoted "$\overset{\tau}{\hat{\tau}}_C(N, T)$", and after calculating the "hierarchy-synthesized accumulated senior influence" on N for T in C, denoted "$\overset{\kappa}{\hat{\tau}}_C(N, T)$". For some of these embodiments, $\overset{\kappa}{\hat{\tau}}_C(N, T)=\hat{\tau}_C(P, T)*z+\Sigma_{1 \leq i \leq k} (\zeta(N_i)*\hat{\rho}(N_i, T)*\alpha(N_i, N))$, and $\overset{\tau}{\hat{\tau}}_C(N, T)=F_T(\hat{\tau}_C(N, T_1)/\check{\tau}_C(N), \ldots, \hat{\tau}_C(N, T_m)/\check{\tau}_C(N))*\check{\tau}_C(N)$, where $F_T$ is the earlier described theme-synthesization function. Note that if $F_T$ has the property that $F_T(x_1*c, \ldots, x_n*c)=F_T(x_1, \ldots, x_n)*c$, then $\overset{\tau}{\hat{\tau}}_C(N, T)=F_T(\hat{\tau}_C(N, T_1), \ldots, \hat{\tau}_C(N, T_m))$. For some embodiments that calculate $\hat{\tau}_C(N, T)$ and $\check{\tau}_C(N, T)$, $\hat{\tau}_C(N, T) = F_R(\hat{\tau}_C(N, T)/\hat{\iota}_C(N), \check{\tau}_C(N, T)/\check{\iota}_C(N))^* \check{\iota}_C(N)$, where $F_R$ is the earlier described reconciliation function. Note that if $F_R$ has the property that $F_R(x^*c, y^*c) = F_R(x, y)^*c$, then $\hat{\tau}_C(N, T) = F_R(\hat{\tau}_C(N, T), \check{\tau}_C(N, T))$.

Various embodiments encapsulate calculation of proportion of potential relevance, per sets of sibling content items, by replacing earlier described Case 4a with Case 4a-i below, and by replacing earlier described Case 4b with Case 4b-i below.

(Case 4a-i) For content item N in content hierarchy C, if $N_1, \ldots, N_k$ comprise the content items that are siblings of N within C, then various embodiments define $\rho_C(N, T)$ as $(\zeta(N)^*\rho(N, T)^*\alpha(N, N) + \Sigma_{1 \leq i \leq k} (\zeta(N_i)^*\hat{\rho}(N_i, T)^*\alpha(N_i, N)) + \hat{\tau}_C(N, T))/(\zeta(N)^*\alpha(N, N) + \Sigma_{1 \leq i \leq k} (\zeta(N_i)^*\alpha(N_i, N)) + \iota_C(N))$.

(Case 4b-i) For content item N in content hierarchy C, if $N_1, \ldots, N_k$ comprise the content items that are siblings of N within C, and if non-atomic theme T corresponds to $T_1$ o $T_2$ o ... o $T_m$, then various embodiments define the theme-synthesized result $\tau_C(N, T)$ as $F_T(\rho_C(N, T_1), \ldots, \rho_C(N, T_m))$, define the hierarchy-synthesized result $\kappa_C(N, T)$ as $(\zeta(N)^*\hat{\rho}(N, T)^*\alpha(N, N) + \Sigma_{1 \leq i \leq k} (\zeta(N_i)^*\hat{\rho}(N_i, T)^*\alpha(N_i, N)) + \hat{\tau}_C(N, T))/(\zeta(N)^*\alpha(N, N) + \Sigma_{1 \leq i \leq k} (\zeta(N_i)^*\alpha(N_i, N)) + \iota_C(N))$, and define $\rho_C(N, T)$ as $F_R(\tau_C(N, T), \kappa_C(N, T))$.

For embodiments that calculate accumulated senior influence, for each content node N for which $\rho_C(N, T)$ is calculated, the senior content items of N are effectively taken in aggregate. In Case 4a-i and Case 4b-i this aggregate is treated in a way similar to the way the sibling content items of N are treated. Some of these embodiments include a "senior influence loop" for each child content node that the $\rho_C$ traversal visits. The senior influence loop for child content node N is an iteration over the siblings of N. As the senior influence loop visits content node N', $\zeta(N')^*\hat{\rho}(N', T)^*\alpha(N', N)$ is added to the sum of inbound sibling influences for N, and $\zeta(N')^*\alpha(N', N)$ is added to the sum of maximum inbound sibling influences for N. When the senior influence loop is complete, these sums are used to calculate $\rho_C(N, T)$ as in Case 4a-i and Case 4b-i. With the $\rho_C$ traversal visiting the siblings of N in turn as an outer loop, the senior influence loop is an inner loop.

According to various embodiments of the present disclosure, any or all instances of any or all the following may be repeated during a single search over a content hierarchy: $\hat{\rho}$ traversal, $\rho_C$ traversal, sibling inbound influence loop, sibling outbound influence loop, senior influence loop. Such repetition allows a content item that doesn't match a given theme to influence the calculated relevance of other content items to that theme. During a first traversal or loop, a non-matching content item may acquire positive proportion of potential relevance. For some embodiments, numbers of repetitions are fixed, as when the sibling inbound influence loop is always run twice. For alternative embodiments, the number of repetitions is determined by diagnostic tests, and when the sibling inbound influence loop is run until aggregate changes in loop results fall below a threshold.

Each of Case 2a, Case 2b, Case 4a, Case 4b, Case 4a-i, and Case 4b-i involves summing influences received from sibling content items. Various embodiments of the present disclosure save such sums as they are computed during the $\hat{\rho}$ traversal and use the saved sums during the $\rho_C$ traversal. Hereafter, for ease of exposition, it will be assumed that sums of influences from sibling content items are saved during the $\hat{\rho}$ traversal so that they may be used during the $\rho_C$ traversal, so that the $\rho_C$ traversal does not involve nested loops over sibling content items.

Various embodiments of the present disclosure establish a bound on the number of children of a content item N within a content hierarchy. When the number of children of content item N exceeds the established bound, the children of N become grandchildren of N, and a level of content item nodes is interposed between N and its former children, so that the number of new nodes is less than the established bound, and so that none of the new nodes has more children than the established bound. If a single level of new nodes isn't sufficient to satisfy the condition that for both N and for each of the new content item nodes established under N, the number of child content items is less than or equal to the established bound, then the operation of interposing a new level of content item nodes is repeated as required. Hereafter, the operation of interposing one or more new levels of content item nodes underneath a content item node will be referred to as "unflattening." Encapsulation per sets of sibling content items doesn't eliminate quadratic processing from the calculation of proportions of potential relevance, but rather reduces the potential for such quadratic processing to involve a large number of computational steps. The unflattening optimization further reduces this potential.

B. Optimizations Based on Applying Computations Only to Selected Content Items

Content hierarchies such as database views, document collections, and even single documents, may include many content items. Within a content hierarchy, a parent content item may have many child content items. Because relevance to themes derives from hits at the terminal level of a content hierarchy, it may be wasteful to calculate $\hat{\rho}$ for content items that contain no hits, and that are not in proximity to content items that contain hits. Further, when calculating $\hat{\rho}$ for a parent content item, it may be wasteful to consider the contributions of child content items that contain no hits, and that are not in proximity to content items that contain hits. Because only certain content items within a content hierarchy may qualify as responses to a user request, it may be wasteful to calculate $\hat{\rho}$ for content items that neither qualify as responses, nor are contained by content items that qualify as responses, nor are in proximity to content items that either qualify as responses or that are contained by content items that qualify as responses or that contain content items that qualify as responses. Further, it may be wasteful to calculate $\rho_C$ for content items that neither qualify as responses, nor contain content items that qualify as responses, nor are in proximity to content items that either qualify as responses or that contain content items that qualify as responses.

Embodiments of the present disclosure apply computations only to selected content items. Suppose that theme T and content hierarchy C and its constituent content items are given. Some of these embodiments calculate $\hat{\rho}(N, T)$ only for selected content items (selection 1). Some of these embodiments calculate $\rho_C(N, T)$ only for selected content items (selection 2). Given a parent content item P for which $\hat{\rho}(P, T)$ is to be calculated, some of these embodiments calculate $\rho_P(N, T)$ only for selected children of P (selection 3). Given a child content item N of parent content item P for which $\rho_P(N, T)$ is to be calculated, some of these embodiments include only selected siblings of N in the summations of earlier described Case 2a and Case 2b (selection 4). Given a parent content item P such that $\rho_C(N, T)$ is to be calculated for one or more children N of P, some of these embodiments include only selected siblings of P in summations used for calculating accumulated senior influence on N, as described earlier (selection 5). Individually and collectively, these selections can drastically reduce the number of steps used to calculate proportions of potential relevance over a content hierarchy.

Suppose that a content request is specified such that in order for a content item N to satisfy the content request, N must satisfy a condition that does not involve relevance to any theme, where the condition may be logically complex. For example, a content request may be for captioned images whose captions are less than 200 characters long, where the captions are relevant to Haydn. For N to satisfy the content request, it must satisfy a condition along the lines of "is a captioned image and contains a caption less than 200 characters long." For another example, a content request may be for captioned images that appear in posts on a social media site, where the posts are more recent than 5 days old, where the authors of the post are site-friends of a certain individual, where the captioned images have captions less than 200 characters long, and where the captions are relevant to Haydn. Hereafter, a content item is a "qualified content item" with respect to a content request if (i) satisfaction of the content request requires satisfaction of a condition that does not involve relevance to any theme, and the content item satisfies this condition, or (ii) satisfaction of the content request does not require satisfaction of a condition that does not involve relevance. A content item N within a content hierarchy is "lineally qualified" with respect to a content request if N is a qualified content item with respect to the content request, or if N contains such a qualified content item, or if N is contained by such a qualified content item. A content item N within a content hierarchy is "collaterally qualified" with respect to a content request if N is lineally qualified with respect to the content request, or if N is a sibling of some lineally qualified content item N', and $\zeta(N)*\alpha(N, N')$ is greater than a stipulated threshold. For example, a new article Web page may include a block (N) of headlines and short summaries of news articles on various topics, where this block includes hits for a given theme. Suppose that only the news article itself (N') is qualified with respect to a given content request. Suppose further that the affinity of the headline-and-summary block to the new article is small, so that $\zeta(N)*\alpha(N, N')$ is less than the stipulated threshold. Then the headline-and-summary block is not collaterally qualified with respect to the content request. Hits for theme T within the headline-and-summary block have little effect on the evaluation of the news article for relevance to T.

(Selection 1) Given content hierarchy C and theme T, for a content item N that isn't a partial match for T, $\hat{\rho}(N, T)=0$, and $\hat{\rho}(N, T')=0$ for all sub-themes T' of T. Various embodiments therefore skip visiting N during the $\hat{\rho}$ traversal. That is, information concerning N that is known prior to the $\hat{\rho}$ traversal may be used during the $\hat{\rho}$ traversal, but $\hat{\rho}$ is not calculated for N, and the descendants of N are not visited during the $\hat{\rho}$ traversal. Suppose that N is a partial match for T, and that only some content items within C are qualified content items for a given content request. Given a content request, if N has only small capacity to affect $\rho_C(N', T)$ for any lineally qualified content item N' within C, then visiting N and its descendants during the $\hat{\rho}$ traversal may be wasteful. Various embodiments therefore skip visiting N and its descendants in C during the $\hat{\rho}$ traversal if N is not a partial match for T, or if N is a partial match for T but is not collaterally qualified. Various embodiments use transformed versions of themes for purposes of determining which content items to skip during the $\hat{\rho}$ traversal. For example, various embodiments delete atomic sub-themes whose frequency of occurrence within a document corpus surpasses a threshold. Various embodiments place conditions on qualities of partial matches to atomic sub-themes, and/or to proportion of atomic sub-themes matched, and/or to number of number of atomic sub-themes matched, in determining which content items to skip during the $\hat{\rho}$ traversal.

(Selection 2) Given content hierarchy C, a content request, and a content item N that is not qualified with respect to the content request, and that is not the ancestor of any content item that is qualified with respect to the content request, various embodiments skip visiting N during the $\rho_C$ traversal. That is, information concerning N that is known prior to the $\rho_C$ traversal may be used during the $\rho_C$ traversal, but $\rho_C$ is not calculated for N, and the descendants of N are not visited during the $\rho_C$ traversal.

(Selection 3) Given content hierarchy C, theme T, and content item N whose parent content item P is visited during the $\hat{\rho}$ traversal, various embodiments skip N during the sibling influence outer loop for P unless N satisfies stipulated conditions corresponding to the potential of N to contribute to which $\hat{\rho}(P, T)$. Some of these embodiments skip N during the sibling influence outer loop unless $\zeta(N)$ is greater than a stipulated threshold. Suppose that $N_1, \ldots, N_k$ are the sibling content items of N and that $\zeta(N)*\alpha(N, N)+\Sigma_{1 \leq i \leq k} (\zeta(N_i)*\alpha(N_i, N))$ is known prior to the $\hat{\rho}$ traversal. Alternative embodiments skip N during the sibling influence outer loop unless $\zeta(N)*(\zeta(N)*\alpha(N, N)+\Sigma_{1 \leq i \leq k} (\zeta(N)*\alpha(N_i, N)))$ is greater than a stipulated threshold.

(Selection 4) Given content hierarchy C, theme T, and content item N whose parent content item P is visited during the $\hat{\rho}$ traversal, various embodiments skip N during the sibling influence inner loop for all or some passes of the sibling influence outer loop unless N satisfies stipulated conditions. Among embodiments that skip content items during the sibling influence inner loop for all passes of the sibling influence outer loop, various embodiments establish a data structure that includes all and only those content items that are not to be skipped during the sibling influence inner loop, and iterate over this data structure once for each pass of the sibling influence outer loop. Various embodiments skip N during the sibling influence inner loop for all passes of the sibling influence outer loop unless N is a partial match for T. Various embodiments skip N during the sibling influence inner loop for all passes of the sibling influence outer loop unless unless N is a partial match for T and $\zeta(N)$ is greater than a stipulated threshold. Suppose that $N_1, \ldots, N_k$ are the sibling content items of N and that $\alpha(N, N)+\Sigma_{1 \leq i \leq k}\alpha(N, N_i)$ is known prior to the $\hat{\rho}$ traversal. Various embodiments skip N during the sibling influence inner loop for all passes of the sibling influence outer loop unless N is a partial match for T and $\zeta(N)*(\alpha(N, N)+\Sigma_{1 \leq i \leq k}\alpha(N, N_i))$ is greater than a stipulated threshold. Partial matches with small salience have small potential influence on their sibling content items. Partial matches with small affinity to their sibling content items, in aggregate, have small potential influence on their sibling content items.

(Selection 5) Given content hierarchy C, theme T, and content item N such that one or more children of N are visited during the $\rho_C$ traversal, and given content item N' that is a sibling of N, various embodiments skip N' during the senior influence loop unless N' satisfies stipulated conditions. Various embodiments skip N' during the senior influence loop unless N' is a partial match for T. Various embodiments skip N' during the senior influence loop unless N' is a partial match for T and $\zeta(N')$ is greater than a stipulated threshold. Suppose that $N_1, \ldots, N_k$ are the sibling content items of N' and that $\alpha(N', N')+\Sigma_{1 \leq i \leq k} \alpha(N', N)$ is known prior to the $\rho_C$ traversal or can be calculated through a closed form. Various embodiments skip N' during the senior influence loop unless N' is a partial match for T and $\zeta(N')*(\alpha(N', N')+\Sigma_{1\leq i\leq k}\alpha(N', N_i))$ is greater than a stipulated threshold.

Figure 3:
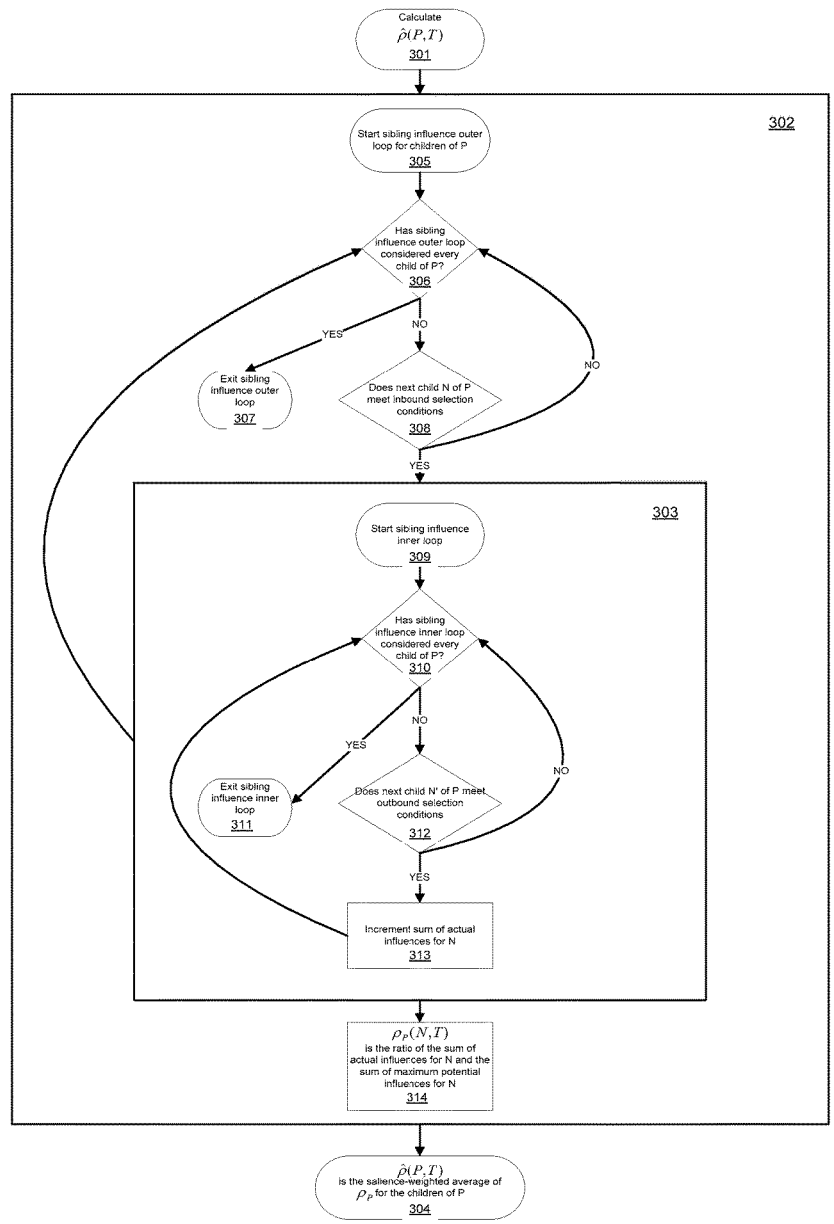
FIGS. 3-4 illustrate selected operations of the content correspondence determination module of FIG. 1, in accordance with various embodiments.

Referring now to FIG. 3, wherein a block diagram is shown illustrating the calculation of $\hat{\rho}(P, T)$ for parent content item P and atomic theme T, in accordance with various embodiments of the present disclosure. As illustrated, for the embodiments, the sibling influence outer loop 302 calls the sibling influence inner loop 303 for children of P that meet inbound selection conditions 308. For each child N of P that meets inbound selection conditions 308, for each child N' of P that meets outbound selection conditions 312, the sibling influence inner loop increments the sum of actual influences for N by $\zeta(N')*\hat{\rho}(N', T)*\alpha(N', N)$ 313. On completion of the sibling influence inner loop for N, $\rho_P(N, T)$ is calculated as $(\Sigma_{1\leq i\leq h} (\zeta(N_{n_i})*\hat{\rho}(N_{n_i}, T)*\alpha(N_{n_i}, N)))/(\Sigma_{1\leq i\leq k}(\zeta(N_i)*\alpha(N_i, N)))$, where $N_1, \ldots, N_k$ are the children of P (including N), and where $N_{n_1}, \ldots, N_{n_h}$ are the children of P that meet the outbound selection conditions for N 314. For the illustrated embodiments, $\Sigma_{1\leq i\leq k} (\zeta(N_i)*\alpha(N_i, N))$ is known prior to the $\hat{\rho}$ traversal, or can be calculated through a closed form. On completion of the sibling influence outer loop, $\hat{\rho}(P, T)$ is calculated as $(\Sigma_{1\leq i\leq k} (\zeta(N_i)*\rho_P(N_i, T)))/(\Sigma_{1\leq i\leq k} (\zeta(N_i)))$, where $N_1, \ldots, N_k$ are the children of P 304.

Figure 4:
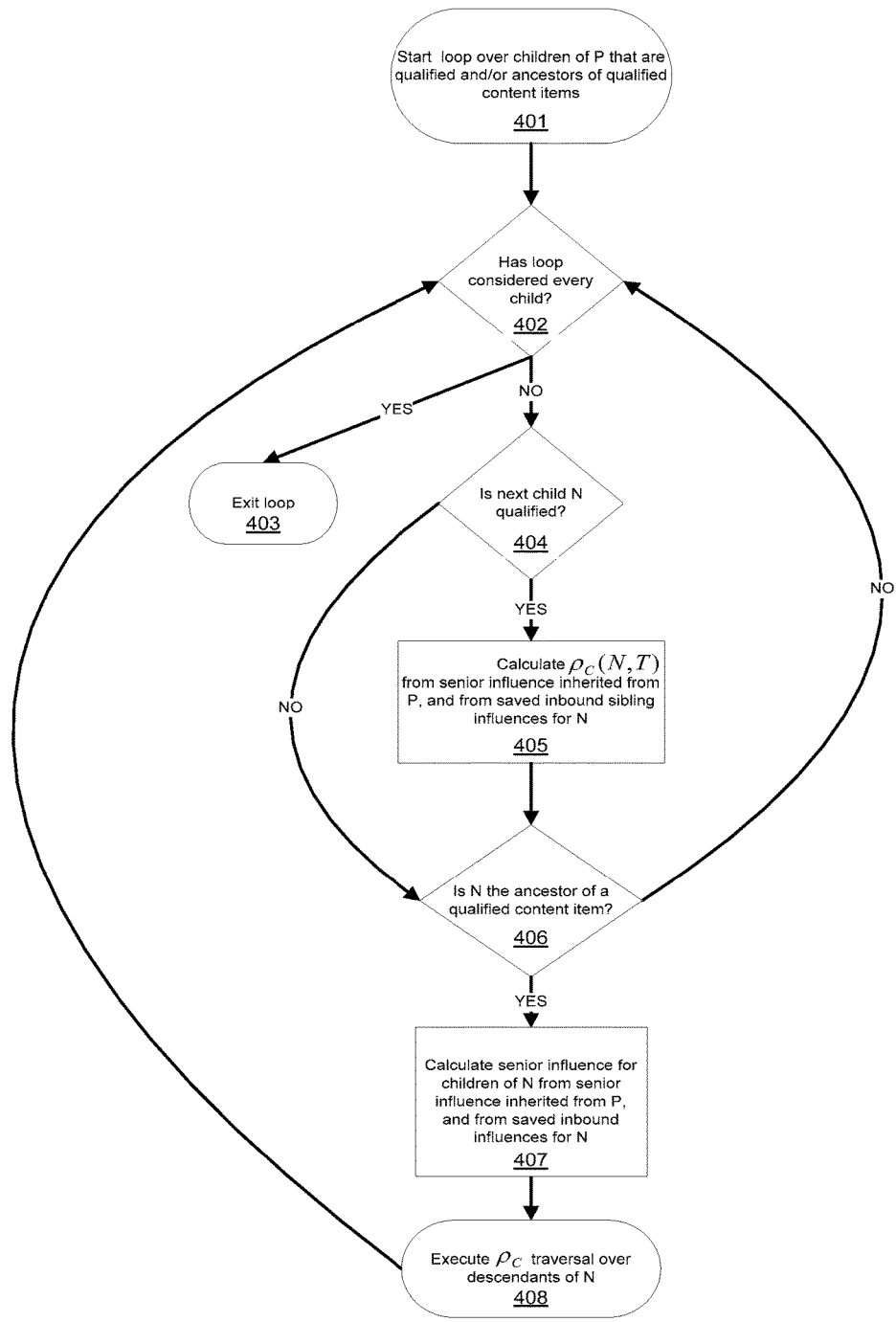

Referring now to FIG. 4, wherein a block diagram is shown illustrating the calculation of $\rho_C$ for descendants of parent content item P and atomic theme T, in accordance with various embodiments of the present disclosure. As illustrated, for the embodiments, if child N of P is qualified 404, $\rho_C(N,T)$ is calculated as $(\Sigma_{1\leq i\leq h} (\zeta(N_{n_i})*\hat{\rho}(N_{n_i}, T)*\alpha(N_{n_i}, N))+\tilde{\tau}_C(N, T))/(\Sigma_{1\leq i\leq k} (\zeta(N_i)*\alpha(N_i, N))+\tilde{\iota}_C(N))$, where $N_1, \ldots, N_k$ are the children of P (including N), where $N_{n_1}, N_{n_h}$ are the children of P that meet outbound selection conditions for N (Selection 4, described above), where $\Sigma_{1\leq i\leq h} (\zeta(N_{n_i})*\hat{\rho}(N_{n_i}, T)*\alpha(N_{n_i}, N))$ is known prior to the $\rho_C$ traversal (as when calculated during the $\hat{\rho}$ traversal), where $\Sigma_{1\leq i\leq k} (\zeta(N_i)*\alpha(N_i, N))$ is known prior to the $\rho_C$ traversal or can be calculated through a closed form, where $\tilde{\tau}_C(N, T)= \tilde{\tau}_C(P, T)*z+\Sigma_{1\leq i\leq h} (\zeta(N_{n_i})*\hat{\rho}(N_{n_i}, T)*\alpha(N_{n_i}, N))$, where $\tilde{\iota}_C(N)=\tilde{\iota}_C(P)*z+\Sigma_{1\leq i\leq k} (\zeta(N_i)*\alpha(N_i, N))$, and where z is the senior influence adjustment factor for N 405. If N is the ancestor of a qualified content item 406, then $\tilde{\tau}_C(N, T)$ and $\tilde{\iota}_C(N)$ are calculated if this has not already been done as a step in the calculation of $\rho_C(N,T)$ 407, and the $\rho_C$ traversal proceeds recursively to the children of N 408.

C. Optimizations Based on Geometric Models of Sub-Content-Hierarchies

A set of sibling content items will be said to conform to a "local geometry" if each sibling can be assigned a position in a Euclidean space, or other geometric space, so that the affinity of sibling content item N to sibling content item N' corresponds to a function of the distance between their positions, as distance is defined for the space. Various embodiments relate affinity to distance according to various functions, where different functions relating distance to affinity may be used within a single content hierarchy. According to various embodiments, if a local geometry is an ordered geometry, sums whose terms include affinities as factors, as in various formulas described above and to be described below, are altered so that proportions of potential relevance are greater when content items are between two or more other content items from which they receive positive influence. Hereafter, for ease of exposition, it will be assumed that for content items N and N' within a set of sibling content items that conforms to a local geometry, $\alpha(N, N')=1/(1+d^x)$, where d is the distance between N and N', and where $x>0$ is a stipulated "attenuation exponent." It will further be assumed that proportions of potential relevance are calculated without consideration of whether content items are between other content items in ordered local geometries.

As an example of a set of sibling content items where each sibling can be associated with a position in a Euclidean space, consider a text where words appear in different fonts. For this example, the salience of each word depends on the word's font, with larger fonts corresponding to larger saliences, and the position of each word corresponds to a point in one-dimensional Euclidean space, with the first word assigned position (0), the second word assigned position (1), and so on. Thus for this example, the saliences assigned to words have no effect on the positions assigned to words. Affinity for this example is a function of Euclidean distance. For variants of this example, the position assigned to a given word depends on saliences of the words that precede the given word in the string.

As a second example of a set of sibling content items where each sibling can be associated with a position in a Euclidean space, consider a database table with n rows, where for any pair of distinct rows, the distance between the rows is the same. Thus the distance between the first row and the second row is the same as the distance between the first row and the last row, and so on. For this example, each row is assigned a position in (n−1)-dimensional Euclidean space, as a vertex of a regular n-simplex. Distance for this example is identified with Euclidean distance.

Note that a single content tree may exhibit different local geometries for different sets of siblings. For example, a content tree may include a set of siblings corresponding to the rows of a table, as in the preceding paragraph, where each row includes a field corresponding to a text, as in the example in the paragraph that precedes the preceding paragraph. Embodiments of the present disclosure impose no requirement that the local geometry of the children of a content node N be related in any way to the local geometry of the children of any ancestor of N, or to the local geometry of children of any descendant of N. Thus the local geometry of the children of N may have a higher dimension than the local geometry of the set of siblings that includes N. For example, consider a Web slide show where each slide shows the five starting players of the Seattle SuperSonics basketball team during a playing season, and the slide show proceeds season by season, from earlier years to later years. The local geometry corresponding to each slide may be given as a regular 5-simplex, with each player corresponding to the vertex of the regular 5-simplex, while the local geometry of the slide show may be given as a 1-dimensional sequence.

According to various embodiments, a single local geometry may apply across multiple levels within a content tree.

Embodiments of the present disclosure use local geometries to ensure that the number of computational steps required to calculate proportions of potential relevance is linear, rather than quadratic, in the number of sibling content items.

Some of these embodiments eliminate the sibling influence inner loop nested within sibling influence outer loop, and instead use a "sibling outbound influence loop" followed by a "sibling inbound influence loop," where neither of these loops is nested within the other. These embodiments use what will be called "influence centers." The sibling outbound influence loop accumulates at influence centers the influences exerted by siblings. The sibling inbound influence loop calculates the influences received by siblings from influence centers. Influence centers are similar to centers of gravity in physics, in the sense that they substitute points of focus for more complex structures, thereby permitting simplified computations. However, no analog of Newton's Shell Theorem applies in general for computations with influence centers. As with the embodiments of USPA No. 2013-0173578 that uses virtual content items, embodiments of the present disclosure that use influence centers produce approximate, but still useful, results.

Various embodiments that use influence centers use a single influence center per sub-theme for a set of sibling content items that conforms to a local geometry. The sibling outbound influence loop iterates over the sibling content items, or over sibling content items that have been selected as discussed above. Suppose that content items $N_1, \ldots, N_k$, are the children of content item P. Various "single influence center" embodiments calculate $\rho_P(N_i, T)$, $1 \leq i \leq k$, for theme T as follows: for each sub-theme T' of T, including T itself, the sibling outbound influence loop accumulates $\Sigma_{1 \leq i \leq k}(\zeta(N_i)*\hat{\rho}(N_i, T')*p(N_i))$ and $\Sigma_{1 \leq i \leq k}(\zeta(N_i)*\hat{\rho}(N_i, T'))$, where $p(N_i)$ is the position of $N_i$ in the local geometry. The sibling outbound influence loop also accumulates $\Sigma_{1 \leq i \leq k}(\zeta(N_i)*p(N_i))$ and $\Sigma_{1 \leq i \leq k}\zeta(N_i)$. Then the position $p_{T'}$ of the influence center for T' is $(\Sigma_{1 \leq i \leq k}(\Sigma_{1 \leq i \leq k}(\zeta(N_i)*\hat{\rho}(N_i, T')*p(N_i)))/(\Sigma_{1 \leq i \leq k}(\zeta(N_i)*T')))$, and the relevance salience $\psi_{T'}$ associated with this influence center is $\Sigma_{1 \leq i \leq k}(\zeta(N_i)*\hat{\rho}(N_i,T'))$. The position $p_{max}$ of the "maximum influence center" for P is $(\Sigma_{1 \leq i \leq k}(\zeta(N_i)*p(N_i)))/(\Sigma_{1 \leq i \leq k}(\zeta(N_i)))$, and the relevance salience $\psi_{max}$ associated with the maximum influence center is $\Sigma_{1 \leq i \leq k}\zeta(N_i)$. The sibling inbound influence loop calculates $\rho_P(N_j, T')$, $1 \leq j \leq k$, as equal to $(\psi_{T'}/(1+d(p_j, p_{T'})^x))/(\psi_{max}/(1+d(p_j, p_{max})^x))$, where $d(p_j, p_{T'})$ is the distance between $N_j$ and the influence center of T' and where $d(p_j, p_{max})$ is the distance between $N_j$ and the maximum influence center for P.

Various embodiments interpose levels of new content items, similarly to the discussion of "unflattening" above, by partitioning a region corresponding to a local geometry into sub-regions, with new content items corresponding to sub-regions. For some of these "grid" embodiments, division into sub-regions is recursive. For some grid embodiments, at a given hierarchical level of sub-regions, the distance between two sub-regions is identified with the distance between their centers. As sub-regions become smaller, results obtained through operation of the sibling inbound influence loop in coordination with the sibling outbound influence loop become more accurate.

Given a parent content item P with children $N_1, \ldots, N_k$ that conform to a local geometry, various embodiments identify a single "receptor position" for $N_1, \ldots, N_k$, and use this receptor position to receive influence from $N_1, \ldots, N_k$. For some of these embodiments, the receptor position is equal to $(\Sigma_{1 \leq i \leq k}(\zeta(N_i)*p_i))/(\Sigma_{1 \leq i \leq k}\zeta(N_i))$, where $p_i$ is the position of $N_i$, $1 \leq i \leq k$. With scaled salience, $\Sigma_{1 \leq i \leq k}\zeta(N_i)=1$, and the receptor position is $\Sigma_{1 \leq i \leq k}(\zeta(N_i)*p_i)$. Given theme T and the receptor position $p_r$, various embodiments accumulate $\Sigma_T = \Sigma_{1 \leq i \leq k}((\zeta(N_i)*\hat{\rho}(N_i, T))/(1+d(p_i, p_r)^x))$ and $\Sigma_{max} = \Sigma_{1 \leq i \leq k}((\zeta(N_i)/(1+d(p_i, p_r)^x))$ in a single iteration over $N_1, \ldots, N_k$. $\Sigma_T$ corresponds to the sum of the influences for T exerted by $N_1, \ldots, N_k$ on the receptor position. $\Sigma_{max}$ corresponds to the maximum possible sum of influences exerted by $N_1, \ldots, N_k$ on the receptor position. Given $\Sigma_T$ and $\Sigma_{max}$, various embodiments use $\Sigma_T/\Sigma_{max}$ as an approximate value for $\hat{\rho}(P, T)$.

Hereafter, search that incorporates methods introduced above will be called "affinitive search."

III. Content Preparation

Some of the inputs to relevance calculations described above are theme-independent, and are calculated from more primitive inputs. Various embodiments of the present disclosure calculate such theme-independent, intermediate results in advance of calculating responses to one or more content requests, and save these theme-independent results so that they can be quickly accessed during theme-dependent calculations. Some of these embodiments store theme-independent intermediate results in association with the content to which the results apply. Calculating theme-independent results and storing them in this way will hereafter be referred to as "theme-independent content preparation."

Various embodiments of the present disclosure calculate relevance results for themes and content items, and store the results in association with the content items. Calculating theme-dependent results and storing them in this way will hereafter be referred to as "theme-dependent content preparation," or alternatively as "match-dependent content preparation." Various embodiments calculate matching results and apposite results for items more generally, as discussed above. Storing such results in association with items will also be referred to "theme-dependent content preparation," or alternatively as "match-dependent content preparation."

Given a set of sibling content items $N_1, \ldots, N_k$, let the "salience sum" for $N_1, \ldots, N_k$ be $\Sigma_{1 \leq i \leq k}\zeta(N_i)$, and let the "maximum mutual influence sum" for $N_1, \ldots, N_k$ be $\Sigma_{1 \leq i \leq k}\Sigma_{i \leq j \leq k}(\zeta(N_i)*\alpha(N_i, N_j))$. For each $N_i$, $1 \leq i \leq k$, let the "maximum outbound influence sum" be $\Sigma_{1 \leq j \leq k}(\zeta(N_i)*\alpha(N_i, N_j))$, and let the "maximum inbound influence sum" be $\Sigma_{1 \leq j \leq k}(\zeta(N_j)*\alpha(N_j, N_i))$. If $N_1, \ldots, N_k$ conform to a local geometry, and if $p_r$ is the receptor position for $N_1, \ldots, N_k$, let the "maximum inbound influence sum" for the receptor position be $\Sigma_{1 \leq i \leq k}((\zeta(N_i)/(1+d(p_i, p_r)^x))$, where x is the attenuation exponent and where $p_i$ is the position of $N_i$, $1 \leq i \leq k$. Given a content hierarchy, various embodiments may perform theme-independent content preparation by calculating and storing some or all of the following, for some or all of the sets of sibling content items within the content hierarchy: salience sum, maximum mutual influence sum, maximum outbound influence sum for some or all siblings, maximum inbound influence sum for some or all siblings, maximum inbound influence sum for the receptor position.

Given a content hierarchy, various embodiments perform theme-independent content preparation by calculating and storing saliences and affinities, scaled or otherwise, for some or all of the content items within the content hierarchy. Calculations of saliences and affinities may rely on prior determination of content categories of content items. Various embodiments perform theme-independent content preparation by determining and storing content categories.

Various embodiments perform theme-independent content preparation by organizing content items into content hierarchies. Organization of content items into content hierarchies may rely on prior determination of containment relationships, or may rely on other bases for parent-child relationships within content hierarchies. Various embodiments perform theme-independent content preparation by determining containment relationships, and/or by determining other bases for parent-child relationships within content hierarchies.

Various embodiments that perform theme-independent content preparation supplement the methods of the present disclosure with various prior art methods. For example, for Web content, various embodiments assign content categories, and/or saliences, and/or affinities, based in part on results of parsing and rendering DHTML. For another example, for database content, various embodiments assign containment relationships among sets of items based on recursive application of cluster analysis.

The methods of USPA No. 2013-0103662 that generate search expressions from content effectively generate themes from content. For content items that contain many words, methods of the present disclosure may limit the sizes of generated themes by including in generated themes only those words, or words as representatives of word classes, whose inverse document frequency measures, with respect to a given content universe, satisfy a threshold, where the threshold may be fixed, or may vary to satisfy a stipulated limit on the size of generated themes. Methods of the present disclosure apply methods described above to determine the relevance of content items within content collections to generated themes. This supports various social media applications described in USPA No. 2013-0103662, such as recommending optimal times for commercial social media posts, or predicting reactions to social media posts. Calculating and storing such recommendations and predictions constitute examples of match-dependent content preparation. Methods of the present disclosure described above support additional social media applications that involve match-dependent content preparation, as well as applications in additional fields that involve match-dependent content preparation. For example, in the online news field, suppose that when a new article is posted, the article is posted together with links to recent topic-related articles. Suppose further that a corpus of prior articles is organized into a content hierarchy, where parent article collections contain child collection articles, and where when the content hierarchy was first established to contain articles that existed at that time, articles were assigned to collections according human judgments of topic similarity, or according to prior art methods of determining topic similarity. Embodiments of the present disclosure use methods of described above to determine which preterminal article collections within the content hierarchy best match the new article, then assign the news article to one or more of these preterminal article collections, storing the assignment or assignments in association with the new article. Various embodiments then select articles within the assigned preterminal article collections, or within article collections that contain the preterminal article collections, according to stipulated criteria, with a stipulated function that trades off among stipulated criteria. Examples of criteria for selecting prior articles include, but are not limited to, degree of match with the new article as assessed by methods of the present disclosure described above, recency of prior articles, and assessed values of prior articles, where Google™ PageRank™ is an example of a process for assessing values of Web pages that present articles Links to selected articles are then posted together with the new article. Various embodiments similarly associate advertisements with articles and article collections, as a partial basis for selecting advertisements to appear with articles. Various embodiments maintain the hierarchy of article collections by storing the associations of the new article with its assigned preterminal article collections. Some of these embodiments provide initial organization of articles into a hierarchy of article collections, in place of or in coordination with prior art methods and human judgments. For these embodiments, initial assignments proceed incrementally, article by article. Among embodiments that maintain hierarchies of article collections, and also among embodiments that provide initial organization of articles into a hierarchy of article collections, various embodiments reassign articles when stipulated conditions for reassignment are met. Examples of stipulated conditions for reassignment include, but are not limited to, conditions that involve size of article collections, conditions that involve relative size of article collections, conditions that involve minimum degree of match among articles within article collections, and conditions that involve average degree of match among articles within article collections. Various embodiments similarly maintain hierarchies of collections of content items other than news articles, and similarly perform selections from such hierarchies.

Embodiments of the present disclosure allow a user to request content by highlighting one or more passages within one or more texts, and/or by highlighting other content. According to various embodiments, users may drag a mouse cursor over text to be highlighted. Other prior art user interface mechanisms for highlighting may be used. According to various embodiments, additional controls, incorporating prior art user interface mechanisms, are available to users, including but not limited to the following: (1) designation of content universe to be searched, where a designated content universe may correspond to the full Web, or to news articles of one or more publications, or to articles of an online reference such as Wikipedia, or to other collections of content and other data; (2) designation of conditions on deliverability of content, such as a range of dates of publication for news articles, or a range of prices for product descriptions; (3) designation of which portion or portions of user viewing history and/or user highlighting history to include as input to the content request; (4) designation of relative weights to be assigned to highlighted text passages, and/or designation of relative weights to be assigned to content items in the viewing history, and/or designation of relative weights to be assigned to content items that have not been viewed. According to various embodiments, some or all of designations (1)-(4) may be calculated according to stipulated rules, without user input, or with incomplete user input. According to various embodiments, search expressions corresponding to highlighted passages are generated according to methods of disclosed in USPA 2013-0103662.

According to various embodiments, weights assigned to passages correspond to weights assigned to sub-themes generated from passages. Hereafter, "$\omega$" (lower-case Greek letter "omega") will be used as a variable over assigned weights. For some embodiments, for themes recursively constructed from sub-themes with the o operator and with parentheses, weights assigned to sibling sub-themes in the theme parse tree are normalized, and the normalized weights are multiplied by proportions of potential relevance for corresponding sub-themes, as inputs to the calculation of theme-synthesized results. Hereafter, "$\overline{\omega}$" will be used as a variable over normalized weights. As described earlier for the case without weights, for $T=T_1 \text{ o } T_2 \text{ o } \ldots \text{ o } T_m$, $\tau_C(N, T)=F_T(\rho_C(N, T_1), \rho_C(N, T_2), \ldots, \rho_C(N, T_m))$. For $1 \leq i \leq m$, if $\omega_i$ is the weight assigned to sub-theme $T_i$, nothing prevents $F_T(\omega_1 * \rho_C(N, T_1), \omega_2 * \rho_C(N, T_2), \ldots, \omega_m * \rho_C(N, T_m))$ from being greater than 1. According to various embodiments that normalize weights assigned to sub-themes, normalization is determined so that the maximum value of $F_T(\overline{\omega}_1 * \rho_C(N, T_1), \overline{\omega}_2 * \rho_C(N, T_2), \ldots, \overline{\omega}_m * \rho_C(N, T_m))$ is 1, where $\overline{\omega}_i$ is the normalized weight assigned to sub-theme $T_i$, $1 \leq i \leq m$. $F_T(\overline{\omega}_1 * \rho_C(N, T_1), \overline{\omega}_2 * \rho_C(N, T_2), \ldots, \overline{\omega}_m * \rho_C(N, T_m))$ reaches its maximum value when $\rho_C(N, T_1)=\rho_C(N, T_2)=\ldots=\rho_C(N, T_m)=1$. Let z be the solution of the equation $F_T(\omega_1 * z, \omega_2 * z, \ldots, \omega_m * z)=1$. Then for these embodiments, $\overline{\omega}_i=\omega_i * z$. For example, suppose that $F_T$ is the geometric mean, that $T=T_1 \text{ o } T_2 \text{ o } T_3$, that $\omega_1=10$, that $\omega_2=50$, and that $\omega_3=100$. Then for the normalization factor z for these weights, $(10*z*50*z*100*z)^{1/3}=1$, so that $z=0.0271$, $\overline{\omega}_1=0.27$, $\overline{\omega}_2=1.36$, and $\overline{\omega}_3=2.71$.

According to various embodiments, histories of user selections, through highlighting or otherwise, are reflected in changes to saliences assigned to content items and sets of content items. For example, if a set of content items corresponding to a node in a content hierarchy has a high proportion of relevance for a theme corresponding to a passage highlighted by a user for purposes of search, the salience assigned to that set of content items may be increased for purposes of subsequent searches by the user. Saliences may also be increased based on searches by sets of users. According to some embodiments that increase saliences based on histories of user selections, saliences that have been increased may subsequently be decreased, for example, as time elapses, or as more searches occur since the search that triggered the increase in salience.

According to various embodiments, for searches that involve one or more highlighted passages, the highlighted passage or passages may be considered in the context of the containing document, or if highlighted passages are contained in more than one document, the highlighted passages may be considered in the context of the containing documents. For some of these embodiments, a more inclusive context than just the immediately containing documents of the highlighted passages may be considered. According to various alternative embodiments, searches that involve one or more highlighted passages are not considered in the context of containing document or documents.

According to various embodiments that do not consider context in this way, a search expression corresponding to a single highlighted passage is constructed according to methods of USPA No. 2013-0103662. For some of these embodiments, for multiple highlighted passages, search expressions for the highlighted passages are constructed according to methods of USPA No. 2013-0103662. If themes corresponding to the highlighted passages are $T_1, \ldots, T_m$, then the content hierarchy is searched for the theme $T_1 \, o \, \ldots \, o \, T_m$.

According to various embodiments that do consider highlighted passages in the context of containing document or documents, search expressions corresponding to non-highlighted passages within the containing document or documents are constructed according to methods of USPA No. 2013-0103662.

According to various embodiments that consider highlighted passages in the context of containing document or documents, search expressions corresponding to non-highlighted passages within the containing document or documents are constructed according to the methods of USPA No. 2013-0103662, in the same way that search expressions corresponding to highlighted passages are constructed. Themes corresponding to search expressions corresponding to non-highlighted passages are assigned lower weights than themes corresponding to search expressions constructed from highlighted passages. For some of these embodiments, common words are elided from search expressions corresponding both to highlighted passages and to non-highlighted passages, but the criteria for identifying common words in non-highlighted passages are different from the criteria for identifying common words in highlighted passages, so that a higher proportion of words are elided from non-highlighted passages. Criteria for eliding words may also vary by weights assigned to passages, in embodiments that consider highlighted passages in the context of containing document or documents, and also in embodiments that do not consider highlighted passages in context. According to various embodiments that consider highlighted passages in the context of containing document or documents, boundaries between highlighted and non-highlighted passages are treated by methods of USPA No. 2013-0103662 similarly to such boundaries as inter-sentence boundaries and inter-paragraph boundaries. Some of these embodiments consider boundaries between highlighted and non-highlighted passages to be the lowest level in the boundary hierarchy, while other embodiments place them at other levels in the boundary hierarchy. Higher-level boundaries within a highlighted passage may effectively divide one highlighted passage into several highlighted passages.

According to various embodiments, weights assigned to both highlighted and non-highlighted passages may be adjusted according to their treatments within their containing documents. For example, passages in bold font, or in larger font, are adjusted to have greater weight.

Embodiments of the present disclosure extend the notion of atomic theme to data such as demographic data, and extend the notion of relevance to correspondences between content and data such as demographic data. For example, given an atomic theme corresponding to "zip code 98001," given a first news article such that it is known or inferred that 50% of the readers of the article have zip code within 50 miles of 98001, and given a second news article such that it is known or inferred that 50% of the readers of the article live more than 500 miles from 98001, the demographic relevance of the first news article to the atomic theme is greater than the demographic relevance of the second news article to the atomic theme. Various embodiments extend the application of the proximity operator o to such atomic themes, and to themes formed by prior application of o to themes, recursively. Given a news article or collection of news articles N for which a demographic profile is known or has been inferred, various embodiments generate a demographic theme corresponding to N by such recursive application of o. Various embodiments then search hierarchies of news articles and collections of news articles, or other hierarchies, according to such demographic themes. The principle that proximity to relevant content is an indicator of relevance may apply when proximity is based on similarity of topics and relevance is based on similarity of demographics. The principle may also apply when proximity is based on similarity of demographics and relevance is based on similarity of topics. Various embodiments iterate search expression generation and search over content hierarchies, where the results of a previous search are used to generate a search expression for a subsequent search, and where the instances of search expression generation and search are based on possibly different relevance criteria and possibly different proximity criteria. For example, a topical search expression may be generated from a given news article $N_1$ according to methods of USPA No. 2013/0103662, and then applied to a content hierarchy C. If news article collection $N_2$ receives the highest topical relevance score for this topical search expression, a demographic search expression may be generated from $N_2$ and then applied to C. If news article collection $N_3$ receives the highest demographic relevance score for this demographic search expression, then news articles contained in $N_3$ have readership with similar demographics as news articles with topics similar to the topics of $N_1$. News articles contained in $N_3$ may thus be good candidates to suggest to readers of $N_1$.

Database technology offers various alternatives for storing and accessing the results of theme-independent and theme-dependent content preparation, as does markup technology. For content that is stored in the form of markup, various embodiments of the present disclosure supplement provided markup with attribute-value pairs, where the attributes may be non-standard. For example, for HTML 5.0, <figure salience="0.1" affinity="0.2, 0.9, 0.3"> can indicate that the content item corresponding to the figure tag has salience 0.1, and that the affinities of this content item to the members of its sibling set, in left-to-right order, are 0.2, 0.9, and 0.3. Various embodiments supplement provided markup with new tag instances, where the tag names may be non-standard. Various embodiments supplement provided markup with new tag instances, where new tag instances collectively constitute one or more parallel bracketing structures to supplement the provided bracketing structure. For example, for HTML 5.0, tags in a parallel bracketing structure might be delimited with ⊢ and ⊣, rather than < and > as in standard HTML 5.0. Suppose that a fragment of provided HTML 5.0 is as follows:

```
<div id="div1">
    <div id="div2">
        <div id="div3">
        </div>
        <div id="div4">
        </div>
        <div id="div5">
        </div>
    </div>
    <div id="div6">
    </div>
</div>
```

Then theme-independent content preparation can interpose a new tag with the non-standard tag name "productDescription" as follows:

```
<div id="div1">
    <div id="div2">
        <div id="div3">
        </div>
        ⊢ productDescription ⊣
        <div id="div4">
        </div>
        <div id="div5">
        </div>
    </div>
    <div id="div6">
    </div>
    ⊢ /productDescription ⊣
</div>
```

The new tag is part of a parallel bracketing structure that cuts across provided HTML 5.0 constituents.

IV. Cross-System Distribution of Content Preparation and Content Request Processing Embodiments of the present disclosure provide for cross-system distribution of content preparation and content request processing.

Content preparation may include, but is not limited to, the following theme-independent content preparation functionalities: (P-1) identification of content items, (P-2) assignment of content items to content categories, (P-3) identification of content hierarchies, (P-4) hierarchical organization of content items within content hierarchies, (P-5) determination of local geometries for sets of content items, (P-6) assignments of saliences to content items, (P-7) assignments of affinities to ordered pairs of content items, (P-8) determination of receptor positions for sets of content items with local geometries, (P-9) determination of salience sums for sets of content items, (P-10) determination of maximum mutual influence sums for sets of content items, (P-11) determination of maximum outbound influence sums for content items within sets of content items, (P-12) determination of maximum inbound influence sums for content items within sets of content items.

Whether or not content preparation includes theme-independent content preparation functionalities, content preparation may include, but is not limited to, the following match-dependent content preparation functionality: (P-13) determination of correspondences between content items and atomic themes.

Search providers currently determine correspondences between Web pages and search terms, which is an example of (P-13), and store the results of such determinations so that given a search term, the identity of Web pages that contain the search term can be rapidly retrieved, and so that the positions of the search term within Web pages that contain it can be rapidly retrieved. (P-13) encompasses inverted indexing for content items more generally, including sub-page content items. (P-2) is similar, but where (P-13) can prepare for retrieval of content items that match search terms, (P-2) can prepare for retrieval of content items that belong to content categories.

For ease of exposition, systems that process Web content may be categorized as authoring systems, content management systems, search engines, proxy server content processing systems, and client content processing systems, such as Web browsers and various mobile apps. Also for ease of exposition, current steps leading to the publication of a Web page may be characterized as follows: (C-1) a server page is manually authored with the assistance of an authoring system, and (C-2) a content management system instantiates the server page by filling its open slots with content, and then publishes the resulting Web page. (C-3) Search engines currently prepare for inclusion of a Web page in search results by assigning one or more values to the Web page, analyzing it for occurrences of search terms, and storing these results, with other information about the Web page. (C-4) In response to search requests, search engines rank Web pages that correspond to a given search request, according to their assigned values and how well they correspond to the search request, and provide search result pages that include links to ranked Web pages and extracts ("captions") from ranked Web pages. (C-5) Search engines, proxy server content processing systems, and client content processing systems may cache Web pages. (C-6) Proxy server content processing systems may parse and/or render and/or transcode Web pages. (C-7) Client content processing systems may parse and/or render and/or paint Web pages. It should be emphasized that this portrayal of the current distribution of Web content preparation functionalities and Web content request processing system functionalities is highly simplified, is incomplete, and that it does not apply universally. Current systems vary widely in their functionalities.

Embodiments of the present disclosure incorporate software modules that may enhance some or all of the following: authoring systems, content management systems, search engines, proxy server content processing systems, client content processing systems, and database management systems in a broad sense of "database management systems" that includes, for example, XML database management systems and database management systems augmented with data mining functionality. For ease of exposition, such software modules may be classified as interactive content preparation modules, fully automatic content preparation modules, affinitive search modules for prepared content, and affinitive search modules for unprepared content. The discussion that follows will focus on the case of Web content, which presents particular challenges related to the size of the World Wide Web, and related to the diversity of the systems that process Web content.

Web content publishers that engage in content preparation might wish to assign excessively large salience and affinity values, in the expectation that this will increase the prominence of their content in search results. Scaling for salience values, as discussed above, and scaling for affinity values, as discussed above, counteract possible publisher attempts to manipulate search results. According to various embodiments, systems that include interactive content preparation modules and/or include fully automatic content preparation modules scale salience and affinity values and otherwise prepare content in accordance with methods of the present disclosure described above. According to some of these embodiments, systems that include such modules supply digital certificates with their outputs, indicating the identity of the systems that wholly or partially prepared the content. Then for these embodiments, systems that include search modules for prepared content validate digital certificates received together with prepared content from systems that prepare content. If a receiving system trusts the systems that prepared content, it searches the prepared content using the supplied assignments of salience and affinity, and using other results of content preparation as described above.

Content preparation modules, whether interactive or fully automatic, may include all or some of the content preparation functionalities described above. According to various embodiments, functionalities may be divided among multiple content preparation modules. For example, one module may assign content categories, while another assigns saliences and affinities, based in part on the output of the first module, while a third module determines salience sums and maximum influence sums, based on the output of the second module. Interactive content preparation modules differ from fully automatic content preparation modules through their elicitation of human input. For example, an interactive content preparation module may offer a Web content author a repertory of content categories, where instances of content categories may contain instances of content categories, as an early step in authoring a server page. For another example, an interactive content preparation module may suggest relative salience assignments within an instance of a content category, and invite the Web content author to accept or amend these suggestions.

Various affinitive search modules for prepared content may be equipped to process content that is prepared to varying extents. According to various embodiments, affinitive search modules that are supplied with unprepared content, or with partially prepared content, perform all or some of the earlier described content preparation steps during the earlier described $\hat{\rho}$ traversal. For these embodiments, when a node is visited during the $\hat{\rho}$ traversal, content preparation operations are performed for that node before other operations described above.

According to various embodiments, the outputs of content preparation modules may be cached and/or published. For example, content management systems may publish content that includes outputs of content preparation systems, recorded in markup as discussed above. For another example, search engines may cache the output of content preparation modules as these modules have applied to the pages of high-traffic Web sites, or to the pages of high-traffic sections of Web sites, and similarly for proxy server content processing systems and client content processing systems.

According to various embodiments, search engines, and/or proxy server content processing systems, and/or client content processing systems that include affinitive search modules may apply these modules to all searched content, or they may apply these modules only to some searched content. They may apply these modules in all circumstances, or they may apply these modules only in some circumstances. For example, systems may apply affinitive search modules only to Web pages that prior art methods rank highly in response to a given search request. For another example, systems may apply affinitive search modules only in response to user requests.

According to various embodiments, systems may apply affinitive search modules in threads whose execution does not interrupt the presentation of content to users, or otherwise interrupt users. For example, as the user examines a search results page that includes links to Web pages that correspond to the user's search, and/or as the user downloads and examines one or more linked-to Web pages, another thread can apply affinitive search modules to linked-to Web pages. The results of affinitive search can subsequently be presented to the user. According to various embodiments, search engines, proxy server content processing systems, and client content processing systems may apply affinitive search in threads whose execution does not interrupt users. According to various embodiments, the content to which such affinitive search is applied may be indicated by the user, either on a case-by-case basis during the course of content presentation, or through criteria established by the user. According to alternative embodiments, the content to which affinitive search is applied may be selected automatically, either by the system that performs affinitive search, or by another system.

According to various embodiments, presentation of the results of affinitive search may be limited to reordering results obtained by prior art search. According to alternative embodiments, the results of affinitive search are presented as orderings of content items of varying granularities, rather than orderings of content items at a single level of granularity. For example, an ordering of Web pages is an ordering of content items at a single level of granularity, while an ordering of content items that includes both Web pages and product descriptions found within Web pages, is an example of an ordering of content items of varying granularities.

According to various embodiments, presentation of the results of affinitive search may include highlighting of content items, and/or scrolling to content items, and/or navigation from content items to other content items. For example, if a content item within a Web page corresponds to a user's search content request, then when the user downloads the Web page, the content item that corresponds to the search content request may be highlighted, and/or the page may be scrolled so that the content item is near the center of the viewing window. For another example, if the content request calls for content that matches a search expression built with the juxtaposition operator, and if a Web page corresponds to the search expression, with various content items within the page having high proportions of potential relevance to various sub-expressions of the search expression, then the presentation of the Web page may include navigation controls whose operation results in successive scrolling between the content items with high proportions of potential relevance to sub-expressions. Embodiments with presentations that include highlighting, and/or scrolling, and/or cross-content-item navigation may be especially useful for mobile Web search applications.

Current Web search results pages are an example of what will hereafter be called "search summary presentations." In a search summary presentation, each search result is represented by a means of navigating to the search result (links to Web pages, in the case of current Web search results pages) and an indication of the contents of the search result (short text extracts containing search terms, in the case of current Web search results pages). According to embodiments of the present disclosure, presentations of affinitive search results may incorporate search summary presentations that indicate matching content items within Web pages, rather than indicating matching text passages within Web pages. For these embodiments, indicated matching content item or content items are presented in the context of the full Web page, possibly with key non-matching content item or items (such as a top-level header, or brand identification) retained, with other non-matching content items elided. Within indicated matching content items, texts that surround search terms are retained, images are represented as simple rectangles, or similar, and other content is elided. General layout characteristics of the Web page are retained, as are general layout characteristics of matching content items. Web pages presented in this way will hereafter be called "selective schematic presentations," where "selective" refers to matching content items and to key non-matching content items. For some of these embodiments, search summary presentations include two links per Web page. Clicking one of these links results in downloading the Web page and painting the viewing window with the contents of the downloaded Web page, as with current search summary presentations. Clicking the other link results in downloading the Web page and painting a selective schematic presentation of the Web page, superimposed over a portion of the search summary presentation. Embodiments with presentations that include selective schematic presentations may be especially useful for mobile Web search applications, and for applications that are supported by proxy server content processing. For some of these embodiments, for a mobile Web search application supported by proxy server content processing, when a user requests a selective schematic presentation of a Web page, the proxy server, rather than the client, can download the page and render the selective schematic presentation, while the client downloads just the selective schematic presentation from the proxy server.

Figure 5:
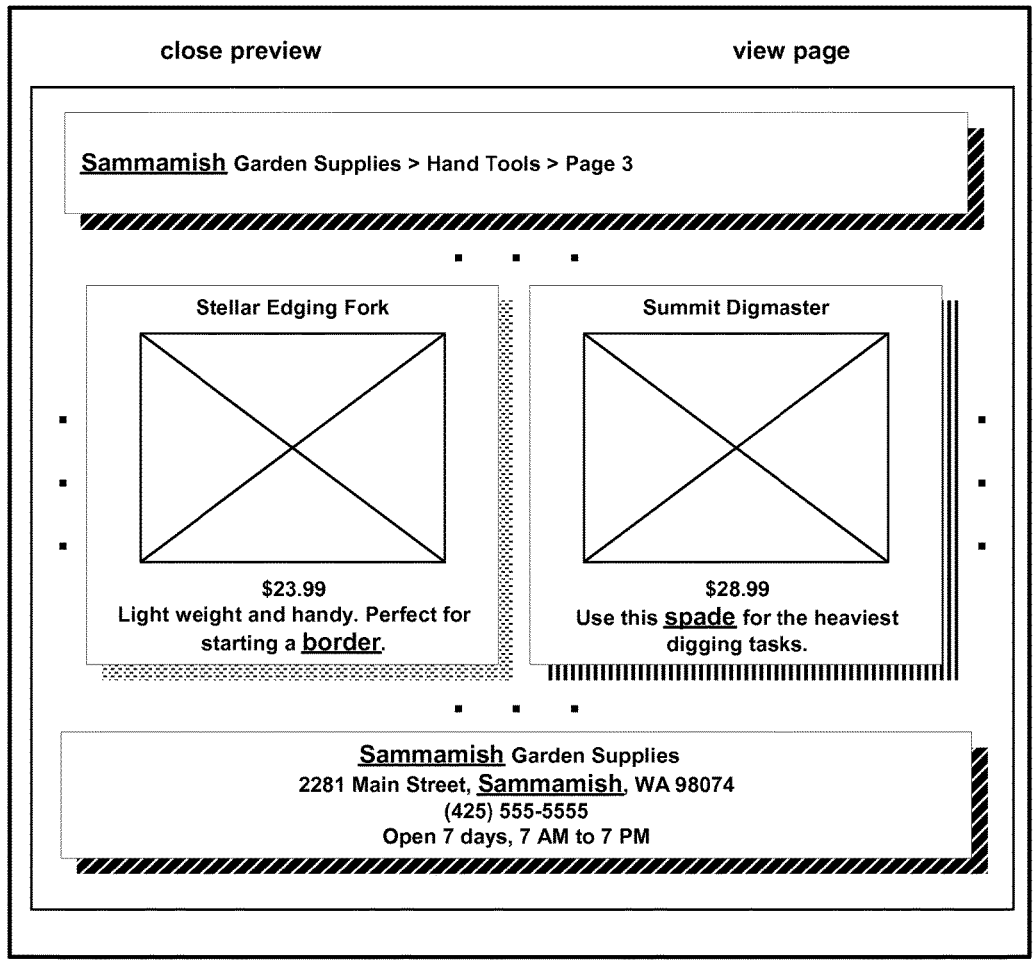
FIG. 5 illustrates a selective schematic presentation of a Web page, in accordance with various embodiments.

Referring now to FIG. 5, wherein a selective schematic presentation of a Web page is shown, in accordance with various embodiments of the present disclosure. The selective schematic presentation is based on a hypothetical Web page associated with a hypothetical retail business, named "Sammamish Garden Supplies." The Web page includes a header, a footer, and 8 rows of product descriptions, where each row contains 4 product descriptions, and where each product description includes a product name, a product image, a product price, and a short product description. According to an illustrative scenario, the user has submitted the search expression "sammamish border spade," and has downloaded the first corresponding search results page, which includes an entry corresponding to the described Sammamish Garden Supplies Web page. An occurrence of "border" is in close proximity to an occurrence of "spade" in the markup corresponding to this Web page. However, the occurrence of "border" and the occurrence of "spade" appear in different product descriptions. Assuming that the user is shopping for a border spade in Sammamish, this Sammamish Garden Supplies Web page is unlikely to be useful, and it will be waste of bandwidth and of user time for the user to download and examine it. In this illustrative scenario, the search results page presents a "show preview" link with each of its entries. That is, for each Web page listed on the search results page, the search results page presents the "show preview" link in addition to the following: a title that also functions as a link to the page, an image of the top of a saved version of the page, the page URL and other information about the page, and one or more text extracts from the page, where the text extracts contain search terms. If the user clicks the "show preview" link for the Sammamish Garden Supplies Web page, the selective schematic presentation is superimposed on the search results page. In FIG. 5, different shadow treatments stand in for different color backgrounds. Thus the header and footer have the same background color, the Stellar Edging Fork product description has a second background color, and the Summit Digmaster product description has a third background color. Horizontal and vertical ellipses represent elided content items. Rectangles with x's represent images. Eliding content items and representing images with rectangles reduced the size of the download associated with the selective schematic presentation itself. The user can see at a glance that "border" and "spade" appear in different product descriptions, and that the page does not respond to the user's intent. The user may therefore choose not to download the page.

V. Computing Device Architecture

Figure 6:
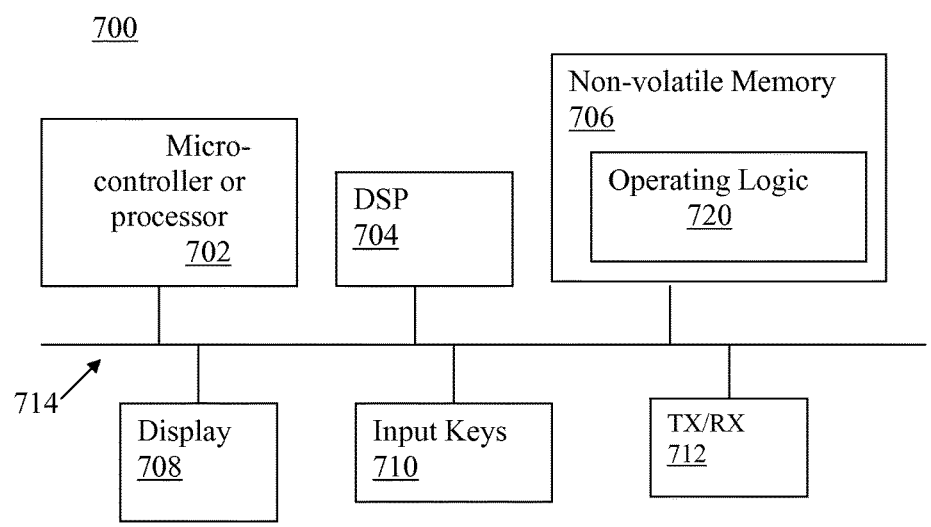
FIG. 6 illustrates an example computing environment suitable for practicing embodiments of the present disclosure.

FIG. 6 illustrates an architecture view of a computing device 700, such as a desktop computer or a PDA, suitable for practicing the present disclosure in accordance with one embodiment. Computing device 700 may be a server or a client. Whether as a server or client, computing device 700 may be coupled to clients or server via a wireless or wireline based interconnection, over one or more private and/or public networks, including the famous public network "Internet".

As illustrated, for the embodiment, computing device 700 includes elements found in conventional computing device, such as micro-controller/processor 702, digital signal processor (DSP) 704, non-volatile memory 706, display 708, input keys 710 (such as keypad, select button, D-unit), and transmit/receive (TX/RX) 712, coupled to each other via bus 714, which may be a single bus or an hierarchy of bridged buses. Further, non-volatile memory 706 includes operating logic 720 adapted to implement selected or all aspects of the earlier described systems, functions, and modules 101-109, in and of itself/themselves or as part of one or more larger components. In other words, the various engines may be implemented on one or more computing systems. For the latter implementations, the computing systems may be directly coupled, through Local and/or Wide Area Networks. The implementation(s) may be via any one of a number programming languages, assembly, C, and so forth.

In alternate embodiments, all or portions of the operating logic 720 may be implemented in hardware, firmware, or combination thereof. Hardware implementations may be in the form of application specific integrated circuit (ASIC), reconfigured reconfigurable circuits (such as Field Programming Field Array (FPGA)), and so forth.

Although specific embodiments have been illustrated and described herein, it will be appreciated by those of ordinary skill in the art that a wide variety of alternate and/or equivalent implementations may be substituted for the specific embodiment shown and described without departing from the scope of the present disclosure. Those with skill in the art will readily appreciate that the present disclosure may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A machine implemented method for content preparation or selection, comprising:
   receiving, as part of a content preparation or selection, by a content preparation or selection module operated by a computing system, a representation of a concept; and
   determining, for the content preparation or selection, by the content preparation or selection module, topical relevance of a content item (N) of a content hierarchy (C) to the concept; wherein the content hierarchy includes a plurality of content items, including N; and wherein determining topical relevance of N to the concept is based at least in part on interrelationships among at least some of other content items of the hierarchy other than N and its descendant content items, including interrelationships between N, an ancestor content item of N, and a sibling content item of the ancestor item of N.

2. The method of claim 1, wherein the hierarchy of content items corresponds to a document, to a sub-document, to a collection of documents, to a collection of sub-documents, to a database of records, to a database of objects, to a collection of database records, or to a collection of database objects; and wherein database records or objects are drawn from one or more databases or one or more database views.

3. The method of claim 1 wherein the content item N is a document, a sub-document, a collection of documents, a collection of sub-documents, a database record, a database object, a collection of database records, or a collection of database objects; and wherein database records or objects are drawn from one or more databases or one or more database views.

4. The method of claim 3, wherein N is one of a plurality of pre-terminal nodes $N_1, \ldots, N_n$ of C; wherein determining further comprises determining topical relevance of each of the other pre-terminal nodes $N_1, \ldots, N_n$ to the concept; and the method further comprises obtaining a content hierarchy $C_1$ from C by assigning a content item $N_{n+1}$ to some $N_j$, $1 \leq j \leq n$, such that the topical relevance of $N_j$ to the concept is greater than or equal to the topical relevance to the concept of the other $N_i$, $1 \leq i \leq n$.

5. The method of claim 3, wherein the content hierarchy C corresponds to a Web page; and wherein the method further comprises displaying N by itself according to a layout stipulated for N in the Web page, in response to determining the topical relevance of N for the concept to be greater than a threshold.

6. The method of claim 1, wherein determining comprises determining with sub-modules of the content preparation or selection module operating in a plurality of parallel threads executing on the computing system.

7. One or more non-transitory computer-readable storage medium comprising a plurality of instructions configured to cause a computer system, in response to execution of the instructions by the computer system, to provide a content preparation or selection module to:
   receive, as part of a content preparation or selection, a representation of a concept; and
   determine, for the content preparation or selection, topical relevance of a content item (N) of a content hierarchy (C) to the concept; wherein the content hierarchy includes a plurality of content items, including N, and wherein determine topical relevance of N to the concept is based at least in part on interrelationships among at least some of other content items of the hierarchy other than N, its ancestor content items, and its descendant content items, including interrelationships between N, an ancestor content item of N, and a sibling content item of the ancestor item of N.

8. The storage medium of claim 7, wherein the content hierarchy comprises a directed acyclic graph, specifying one or more assignments of relative prominence for the content items of the content hierarchy, and one or more assignments of relative distance for ordered pairs of content items of the content hierarchy; wherein the content item N is a first content item, and the content hierarchy further includes a second content item ($N_2$) and a third content item ($N_3$), where none of N, $N_2$, and $N_3$ is an ancestor of any other of N, $N_2$, and $N_3$ according to the directed acyclic graph, where the prominence of $N_2$ is greater than or equal to the prominence of $N_3$, where the distance from $N_3$ to N is greater than or equal to the distance from $N_2$ to N; and wherein determine comprises determine a topical relevance score of N for the concept that is greater, when $N_3$ has a greater topical relevance score determined for the concept than $N_2$, than when $N_2$ has a greater topical relevance score determined for the concept than $N_3$.

9. The storage medium of claim 8, wherein determine the topical relevance for N to the concept comprises including topical relevance of the second content item ($N_2$), where $N_2$ is not in an ancestor or descendant relationship with N, and where $N_2$ has a topical relevance to the concept below a threshold.

10. The storage medium of claim 8, wherein determine comprises:
    when
    the concept is a result of applying a juxtaposition operator O to a first sub-concept and a second sub-concept,
    a second content hierarchy $C_2$ includes a second content item $N_2$,
    a first sub-hierarchy of C whose root in N is identical to a second sub-hierarchy of $C_2$ whose root in $N_2$, with respect to member content items, parent-child relationships, assignments of relative prominence to content items, assignments of distances between content items, and assignments of topical relevance scores for the concept, the first sub-concept, and the second sub-concept to member content items other than N and $N_2$,
    a topical relevance score for the first sub-concept for $N_2$ in $C_2$ is greater than or equal to the topical relevance score for the first sub-concept for N in C, and
    a topical relevance score for the second sub-concept for $N_2$ in $C_2$ is greater than or equal to the topical relevance score for the second sub-concept for N in C,
    determine comprises determine a topical relevance score for the concept for N in C that is greater than a topical relevance score for the concept for $N_2$ in $C_2$.

11. The storage medium of claim 10, wherein determine further comprises assignment of weights to arguments of the juxtaposition operator, so that relevance scores of N for child sub-concepts of the concept are multiplied by the weights prior to calculation of topical relevance scores of N for parent sub-concepts of the concept.

12. The storage medium of claim 10, wherein the concept corresponds to a search expression, and wherein execution of the instructions further causes the computer system to provide a search expression generator to:
    receive a second content item ($N_2$), and user input indicating one or more portions of $N_2$; and
    generate the search expression, based on $N_2$, to facilitate evaluating $N_2$ based at least in part on searching other content items through execution of the search expression, wherein the search expression indicates nested juxtapositions of sub-expressions of the search expression;
   wherein generate comprises recursively divide text of $N_2$ into subtexts, and transform the subtexts, including the one or more portions of $N_2$ indicated by the user input, into the search sub-expressions;
   wherein generate further includes insert instances of a juxtaposition operator between sequence elements, and between sibling parenthesized expressions within a parenthesization hierarchy, during the recursive division; and
   wherein generate further includes assign weights to the sub-expressions with the sub-expressions including the one or more portions of $N_2$ indicated by the user input being assigned greater weights than sub-expressions that do not include the one or more portions of $N_2$ indicated by the user input.

13. The storage medium of claim 8, wherein determine comprises determine a topical relevance score for N for the concept that is a ratio of a numerator and a denominator, where the numerator of the ratio is a sum of terms where each term includes a topical relevance score of a content item of C that is not in an ancestor-descendant relationship with N within C, and where the denominator of the ratio is a sum of terms where each term includes a maximum topical relevance score of a content item of C that is not in an ancestor-descendant relationship with N within C.

14. The storage medium of claim 13, wherein content hierarchy C contains content hierarchy $C_2$, and $C_2$ contains content item N, and wherein determine comprises determine a topical relevance score to the concept for N relative to C that is different from a topical relevance score to the concept determined for N relative to $C_2$.

15. The storage medium of claim 14, wherein determine comprises performance of a first depth-first traversal of the content hierarchy C to calculate topical relevance of the content item N to the concept, relative to a sub-hierarchy whose root is the content item N, and performing a second depth-first traversal of content hierarchy C to calculate topical relevance of N to the concept, relative to C.

16. The storage medium of claim 15, wherein performance of each depth-first traversal comprises application of a number of inputs to one set of sibling content items of N at a time; wherein the number of inputs per application to a set of sibling content items is less than or equal to $k_1 * n + k_2$, where n is the number of sibling content items in a particular case, and where $k_1$ and $k_2$ are fixed for all sets of sibling content items, for all content hierarchies.

17. The storage medium of claim 16, wherein performance of the second depth-first traversal comprises application to a set of sibling content items, an accumulated effect on topical relevance scores that these sibling content items receive from descendant content items of siblings of their ancestor content items.

18. The storage medium of claim 15, wherein determine further comprises prior to performing the first and second depth-first traversals, perform one or more traversals that calculate inputs to the first and second depth-first traversals, where the calculated inputs are not dependent on the concept.

19. The storage medium of claim 18, wherein performance of one or more traversals that calculate inputs to the first and second depth-first traversals comprises scaling calculation of prominences of content items in C and distances between content items in C so that a maximum sum of increments of a topical relevance score of the content item N in C received through the proximity of N to other content items in C is less than or equal to k, where k is fixed for all content hierarchies.

20. The storage medium of claim 19, wherein for content hierarchies corresponding to Web pages, the content preparation or selection module is to further store results of the scaled calculations as amendments to the Web page, and supply a digital certificate verifying an identity of the content preparation or selection module that supplied the amendments.

21. The storage medium of claim 7, wherein the concept corresponds to a result of applying a search expression generator to a result of a prior search, where the prior search is over the same or a different content hierarchy, and has same or different relevance criteria.

22. An apparatus for content preparation or selection, comprising:
   one or more processors; and
   a content preparation or selection module operated by the processor:
   receive, as part of a content preparation or selection, a representation of a concept; and
   determine, for the content preparation or selection, topical relevance of a content item (N) of a content hierarchy (C) to the concept; wherein the content hierarchy includes a plurality of content items, including N, and wherein determine topical relevance of N to the concept is based at least in part on interrelationships among at least some of other content items of the hierarchy other than N, its ancestor content items, and its descendant content items, including interrelationships between N, an ancestor content item of N, and a sibling content item of the ancestor item of N.

23. The apparatus of claim 22, wherein the content hierarchy comprises a directed acyclic graph, specifying one or more assignments of relative prominence for the content items of the content hierarchy, and one or more assignments of relative distance for ordered pairs of content items of the content hierarchy; wherein the content item N is a first content item, and the content hierarchy further includes a second content item ($N_2$) and a third content item ($N_3$), where none of N, $N_2$, and $N_3$ is an ancestor of any other of N, $N_2$, and $N_3$ according to the directed acyclic graph, where the prominence of $N_2$ is greater than or equal to the prominence of $N_3$, where the distance from $N_3$ to N is greater than or equal to the distance from $N_2$ to N; and wherein determine comprises determine a topical relevance score of N for the concept that is greater, when $N_3$ has a greater topical relevance score determined for the concept than $N_2$, than when $N_2$ has a greater topical relevance score determined for the concept than $N_3$.

24. The apparatus of claim 23, wherein determine the topical relevance for N to the concept comprises including topical relevance of the second content item ($N_2$), where $N_2$ is not in an ancestor or descendant relationship with $N_1$, and where $N_2$ has a topical relevance to the concept below a threshold.

25. The apparatus of claim 23, wherein the concept comprises a search expression, and wherein the apparatus further comprises a search expression generator operated by the one or more processors to:
   receive a second content item ($N_2$), and user input indicating one or more portions of $N_2$; and
   generate the search expression, based on $N_2$, to facilitate evaluating $N_2$ based at least in part on searching other content items through execution of the search expression, wherein the search expression indicates nested juxtapositions of sub-expressions of the search expression;

wherein generate comprises recursively divide text of $N_2$ into subtexts, and transform the subtexts, including the one or more portions of $N_2$ indicated by the user input, into the search sub-expressions;

wherein generate further includes insert instances of a juxtaposition operator between sequence elements, and between sibling parenthesized expressions within a parenthesization hierarchy, during the recursive division; and wherein generate further includes assign weights to the sub-expressions with the sub-expressions including the one or more portions of $N_2$ indicated by the user input being assigned greater weights than sub-expressions that do not include the one or more portions of $N_2$ indicated by the user input.

* * * * *